(12) United States Patent
Byun et al.

(10) Patent No.: US 11,715,480 B2
(45) Date of Patent: Aug. 1, 2023

(54) CONTEXT-BASED SPEECH ENHANCEMENT

(71) Applicant: QUALCOMM Incorporated, San Diego, CA (US)

(72) Inventors: Kyungguen Byun, Seoul (KR); Shuhua Zhang, San Diego, CA (US); Lae-Hoon Kim, San Diego, CA (US); Erik Visser, San Diego, CA (US); Sunkuk Moon, San Diego, CA (US); Vahid Montazeri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/209,621

(22) Filed: Mar. 23, 2021

(65) Prior Publication Data

US 2022/0310108 A1  Sep. 29, 2022

(51) Int. Cl.
*G10L 21/0232* (2013.01)
*G10L 21/038* (2013.01)
*G10L 21/02* (2013.01)

(52) U.S. Cl.
CPC .......... *G10L 21/0232* (2013.01); *G10L 21/02* (2013.01); *G10L 21/038* (2013.01)

(58) Field of Classification Search
CPC .......................... G10L 21/038; G10L 21/0232
See application file for complete search history.

(56) References Cited

U.S. PATENT DOCUMENTS

| 10,157,611 | B1* | 12/2018 | Wolff | G10L 15/22 |
|---|---|---|---|---|
| 2017/0092268 | A1* | 3/2017 | Kristjansson | G10L 15/16 |
| 2018/0247636 | A1* | 8/2018 | Arik | G10L 25/30 |
| 2018/0366138 | A1* | 12/2018 | Ramprashad | G10L 21/0208 |
| 2019/0114489 | A1* | 4/2019 | Jackson | G10L 25/51 |
| 2019/0251168 | A1* | 8/2019 | McCann | G06N 3/04 |
| 2019/0287012 | A1* | 9/2019 | Celikyilmaz | G06N 3/0445 |
| 2019/0392852 | A1* | 12/2019 | Hijazi | H04N 21/2335 |
| 2020/0074988 | A1* | 3/2020 | Park | G06N 3/08 |
| 2020/0075038 | A1* | 3/2020 | Sung | H04M 3/2236 |
| 2020/0184987 | A1* | 6/2020 | Kupryjanow | G10L 15/16 |

FOREIGN PATENT DOCUMENTS

| CN | 110867192 A | 3/2020 |
|---|---|---|
| CN | 111863009 A | 10/2020 |
| WO | 2020042707 A1 | 3/2020 |

OTHER PUBLICATIONS

Nicolson, Aaron, and Kuldip K. Paliwal. "Masked multi-head self-attention for causal speech enhancement." Speech Communication 125 (2020): 80-96. (Year: 2020).*
International Search Report and Written Opinion—PCT/US2022/070526—ISA/EPO—dated May 17, 2022.
Vaswani A., et al.,"Attention Is All You Need", arXiv:1706.03762v5, Dec. 6, 2017, pp. 1-15.

* cited by examiner

*Primary Examiner* — Shaun Roberts
(74) *Attorney, Agent, or Firm* — QUALCOMM Incorporated

(57) ABSTRACT

A device to perform speech enhancement includes one or more processors configured to obtain input spectral data based on an input signal. The input signal represents sound that includes speech. The one or more processors are also configured to process, using a multi-encoder transformer, the input spectral data and context data to generate output spectral data that represents a speech enhanced version of the input signal.

28 Claims, 13 Drawing Sheets

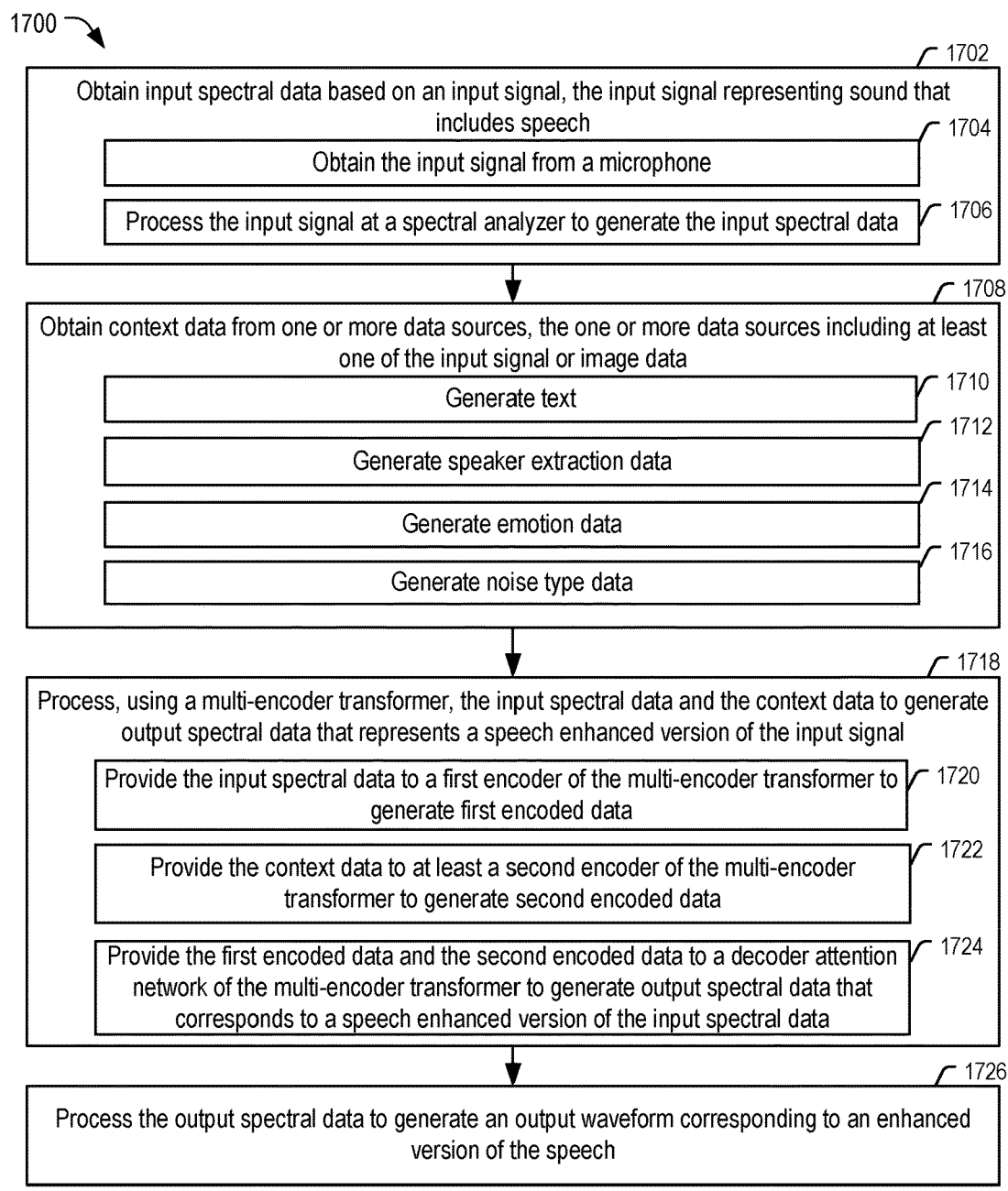

CONTEXT-BASED SPEECH ENHANCEMENT

I. FIELD

The present disclosure is generally related to speech enhancement.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. Such devices may include applications that perform noise suppression and speech enhancement. For example, a device can perform an analysis of a noisy speech signal in a frequency domain that uses a deep neural network to reduce the noise and then reconstruct the speech. However, under some conditions, such techniques can fail to suppress noise. In an example, abrupt and stationary noise, such as clapping, can be difficult to remove from the noisy speech signal. Improving a device's speech enhancement capability improves performance of various speech-related applications that may be performed at the device, such as communications and speech-related recognition systems, including automatic speech recognition (ASR), speaker recognition, emotion recognition, and event detection.

III. SUMMARY

According to one implementation of the present disclosure, a device to perform speech enhancement includes one or more processors configured to obtain input spectral data based on an input signal. The input signal represents sound that includes speech. The one or more processors are also configured to process, using a multi-encoder transformer, the input spectral data and context data to generate output spectral data that represents a speech enhanced version of the input signal.

According to another implementation of the present disclosure, a method of speech enhancement includes obtaining input spectral data based on an input signal. The input signal represents sound that includes speech. The method also includes processing, using a multi-encoder transformer, the input spectral data and context data to generate output spectral data that represents a speech enhanced version of the input signal.

According to another implementation of the present disclosure, a non-transitory computer-readable medium stores instructions that, when executed by one or more processors, cause the one or more processors obtain input spectral data based on an input signal. The input signal represents sound that includes speech. The instructions, when executed by the one or more processors, also cause the one or more processors to process, using a multi-encoder transformer, the input spectral data and context data to generate output spectral data that represents a speech enhanced version of the input signal.

According to another implementation of the present disclosure, an apparatus includes means for obtaining input spectral data based on an input signal. The input signal represents sound that includes speech. The apparatus also includes means for processing, using a multi-encoder transformer, the input spectral data and context data to generate output spectral data that represents a speech enhanced version of the input signal.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 16 is diagram of a particular implementation of a method of speech enhancement that may be performed by the device of FIG. 1, in accordance with some examples of the present disclosure.

FIG. 17 is diagram of another particular implementation of a method of speech enhancement that may be performed by the device of FIG. 1, in accordance with some examples of the present disclosure.

V. DETAILED DESCRIPTION

Systems and methods of improved speech enhancement using context information are described. Conventional systems that operate to remove noise in a frequency domain using a deep neural network and then reconstruct the speech often fail to remove noise under certain circumstances, such as abrupt and stationary noise (e.g., clapping). Failure to sufficiently reduce noise affects performance of speech-related applications that may be performed at the device, such as communications and speech-related recognition systems, including ASR, speaker recognition, emotion recognition, and event detection.

The disclosed context-based speech enhancement uses multi-modal information to enable enhanced speech enhancement as compared to conventional noise reduction processing for an input speech signal. According to some aspects, different types of context information can be separately encoded, such as speaker information, text information, video information, emotion, and noise type, as illustrative, non-limiting examples. A multi-encoder, such as implemented in a multi-encoder transformer, processes the spectrum of the input speech signal in addition to the context information. The use of multi-source information enables improved spectrum enhancement and results in generation of improved speech enhancement as compared to conventional techniques that operate on the speech spectrum only. As a result, communications and speech-related recognition systems, including ASR, speaker recognition, emotion recognition, and event detection, benefit from improved performance. Performance of systems that use such communications and speech-related recognition systems also improves, which improves overall operation of a device (e.g., a mobile phone) that uses such systems.

Figure 1:
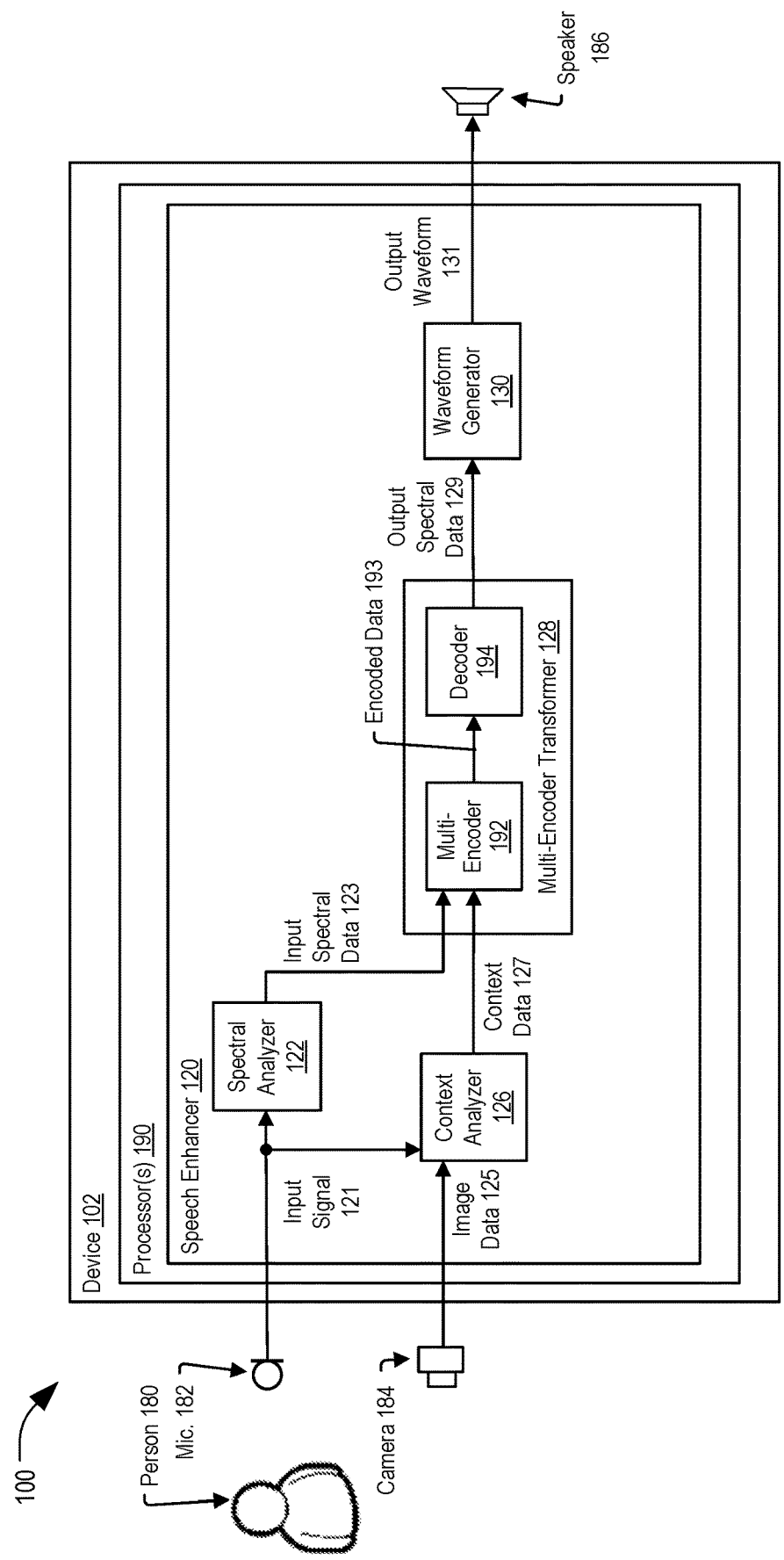
FIG. 1 is a block diagram of a particular illustrative aspect of a system operable to perform context-based speech enhancement, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to perform context-based speech enhancement is disclosed and generally designated 100. The system 100 includes a device 102 that includes one or more processors 190 configured to generate enhanced speech using a speech enhancer 120. In some implementations, the device 102 is coupled to a microphone 182, a camera 184, or both. In a particular implementation, the microphone 182, the camera 184, or both are external to the device 102. In an alternative implementation, the microphone 182, the camera 184, or both are integrated in the device 102.

The speech enhancer 120 is configured to perform context-based speech enhancement by operating on input signals, such as an input signal 121 that is received from the microphone 182, received from communications components (e.g., during a phone call or virtual meeting environment), or received from storage at a memory of the device 102 or a remote storage location (e.g., for transcription of stored audio). As used herein, "speech enhancement" refers to performing speech extraction or separation from a noisy input signal, noise suppression (e.g., noise reduction or elimination) from the noisy input signal, or a combination thereof.

The speech enhancer 120 includes a spectral analyzer 122, a context analyzer 126, a multi-encoder transformer 128, a waveform generator 130, or a combination thereof. In a particular aspect, the spectral analyzer 122 is configured to receive the input signal 121 from the microphone 182 and is further coupled to the context analyzer 126, the multi-encoder transformer 128, or both. The context analyzer 126 is coupled via the multi-encoder transformer 128 to the waveform generator 130. In a particular aspect, the context analyzer 126 is configured to receive image data 125, such as video or still image data, in visible wavelengths and/or non-visible wavelengths (e.g., infrared), from the camera 184.

The spectral analyzer 122 is configured to receive an input signal 121 representing sound that includes speech and to process the input signal 121 to generate input spectral data 123 of the speech. In a particular example, the input signal 121 includes an audio signal, e.g., received via the microphone 182 or retrieved from a storage device. In a particular example, the spectral analyzer 122 is configured to perform feature extraction to generate Mel-scale spectrograms, fundamental frequency (F0) features, or a combination thereof, as the input spectral data 123. The input spectral data 123 includes spectral data of both speech and non-speech content (noise) from the input signal 121 and may be referred to as a "noisy spectrum."

The context analyzer 126 is configured to generate context data 127 based on the input signal 121, the input spectral data 123, the image data 125, or a combination thereof, as further described with reference to FIG. 2. The image data 125 may be captured by the camera 184 concurrently with capture of the input signal 121 by the microphone 182 and includes contextual information that can assist in generating an enhanced speech signal. For example, the image data 125 can provide information as to the identity or physical characteristics of a person 180 speaking, an emotional state of the person 180 (e.g., happy, angry, excited, sad, or neutral emotion), information regarding one or more noise sources (e.g., a second person speaking, a dog barking, a car passing by), one or more other types of contextual information, or a combination thereof. In a particular aspect, the context data 127 corresponds to an embedding (e.g., an embedding vector) that represents the input signal 121, the input spectral data 123, the image data 125, or a combination thereof.

The multi-encoder transformer 128 is configured to process the input spectral data 123 and the context data 127 to generate output spectral data 129, as further described with reference to FIGS. 3-5. The multi-encoder transformer 128 includes a multi-encoder 192 and a decoder 194. The multi-encoder 192 is configured to process the input spectral data 123 based on the context data 127 to generate encoded data 193 corresponding to an output waveform 131. For example, the output waveform 131 is based on the encoded data 193, after decoding by the decoder 194 and processing by the waveform generator 130.

The waveform generator 130 is configured to process the output spectral data 129 to generate the output waveform 131. The output waveform 131 corresponds to a speech enhanced version of the input signal 121. The waveform generator 130 can include a neural vocoder or an inverse fast Fourier transform (FFT) engine (e.g., configured to perform an inverse short-time Fourier transform (STFT)) and can also include a synthesis filter bank, as illustrative, non-limiting examples. The output waveform 131 is provided to the speaker 186 for playback to a user of the device 102. Alternatively, or in addition, the output waveform 131 can be provided to one or more other components of the device 102, such as for speech recognition or other speech processing, communications (e.g., telephony), or storage (e.g., in a memory of the device 102).

In a particular aspect, the multi-encoder 192 includes a first encoder configured to process the input spectral data 123 independently of the context data 127 to generate first encoded data and includes one or more second encoders configured to process the context data 127 to generate second encoded data, as further described with reference to FIG. 3 and FIG. 4. The decoder 194 is configured to generate the output spectral data 129 based on the encoded data 193 (e.g., the first encoded data and the second encoded data), as further described with reference to FIG. 3 and FIG. 4. The waveform generator 130 is configured to perform speech synthesis on the output spectral data 129 to generate the output waveform 131 that represents a speech-enhanced version of the speech indicated by the input spectral data 123.

In some implementations, the device 102 corresponds to or is included in various types of devices. In an illustrative example, the processor 190 is integrated in a headset device that includes the microphone 182, such as described further with reference to FIG. 9. In other examples, the processor 190 is integrated in at least one of a mobile phone or a tablet computer device, as described with reference to FIG. 8, a wearable electronic device, as described with reference to FIG. 10, a voice-controlled speaker system, as described with reference to FIG. 11, a camera device, as described with reference to FIG. 12, or a virtual reality, augmented reality, or mixed reality headset, as described with reference to FIG. 13. In another illustrative example, the processor 190 is integrated into a vehicle that also includes the microphone 182, such as described further with reference to FIG. 14 and FIG. 15.

During operation, the spectral analyzer 122 receives an input signal 121 via the microphone 182 and generates input spectral data 123 of the input signal 121. For example, the microphone 182 captures speech (e.g., "unlock the door") of the person 180 and provides the input signal 121 representing the speech to the spectral analyzer 122. The speech (e.g., "unlock the door") represented by the input signal 121 includes, in addition to the vocal content, additional context that can be estimated from the speech characteristics of the person 180 and accompanying noise, such as an emotion of the person 180, an identity of the person 180, and a type of noise captured by the microphone 182.

The device 102 also receives or accesses the image data 125. In a particular aspect, the image data 125 includes video or image content related to the input signal 121. For example, the image data 125 can include information that can assist in identifying the person 180, an emotional state of the person 180, a type of noise (e.g., hand clapping) accompanying the speech of the person 180, other contextual information, or a combination thereof.

The context analyzer 126 generates context data 127 based on the input signal 121 and the image data 125, as further described with reference to FIG. 2. In an illustrative example, the context data 127 corresponds to an embedding (e.g., an embedding vector) that represents aspects of the input signal 121 and the image data 125.

The multi-encoder transformer 128 processes the input spectral data 123 and the context data 127 to generate output spectral data 129, as further described with reference to FIG. 3 and FIG. 4. For example, a first encoder of the multi-encoder 192 processes the input spectral data 123 independently of the context data 127 (e.g., based on the input spectral data 123 alone, without accessing the context data 127) to generate first encoded data, as further described with reference to FIG. 3 and FIG. 4. One or more second encoders of the multi-encoder 192 process the context data 127 to generate second encoded data, as further described with reference to FIG. 3 and FIG. 4. In a particular implementation, the one or more second encoders process the context data 127 concurrently with the first encoder processing the input spectral data 123. The multi-encoder 192 provides encoded data 193 (e.g., the first encoded data, the second encoded data, or a combination thereof) to the decoder 194. In a particular aspect, the encoded data 193 corresponds to an output embedding (e.g., an embedding vector) of the multi-encoder 192.

The decoder 194 processes the encoded data 193 (e.g., the first encoded and the second encoded data) to generate the output spectral data 129, as further described with reference to FIG. 3. The waveform generator 130 performs speech synthesis on the output spectral data 129 to generate an output waveform 131. The output waveform 131 corresponds to a speech-enhanced version of the input signal 121.

Using the context data 127 in conjunction with the input spectral data 123 enables the speech enhancer 120 to attain improved enhancement quality as compared to conventional systems that perform speech enhancement on a speech signal alone. As an example, speech enhancement can be significantly improved in low signal-to-noise ratio (SNR) scenarios in which the speech is accompanied by significant noise, as compared to conventional systems. Even in scenarios in which the context data 127 does not provide sufficient information for exact determinations (e.g., low light prevents precise identification of the person 180), the information provided in the context data 127 can help to improve speech enhancement performance as compared to systems that do not use any context information.

Various modifications to the system 100 can be incorporated in accordance with other implementations. For example, although the multi-encoder 192 and the decoder 194 are described as included in the multi-encoder transformer 128, in other implementations the multi-encoder 192 and the decoder 194 have a configuration other than a transformer. Although the device 102 is described as receiving the input signal 121 and generating the input spectral data 123 based on the input signal 121, in other implementations the device 102 can receive the input spectral data 123, such as from processing circuitry of the microphone 182 or from another device. Although the context analyzer 126 is illustrated as receiving the image data 125 and the input signal 121, in other implementations the context analyzer 126 receives the input spectral data 123 instead of, or in addition to, the input signal 121.

In some implementations, the camera 184 can be omitted, such as when the image data 125 is received from memory or via transmission. According to some aspects, the camera 184 can be replaced by or supplemented with other sensors, such as location sensors (e.g., global positioning system (GPS) sensors) that generate location data, motion sensors (e.g., accelerometers, gyroscopes, other inertial measurement units) that generate motion data, ultrasound sensors, one or more other sources of context data, or any combination thereof.

Although the microphone 182 is illustrated as being coupled to the device 102, in other implementations the microphone 182 may be integrated in the device 102. Although one microphone 182 is illustrated, in other implementations one or more additional microphones configured to capture user speech may be included. In some implementations, the microphone 182 is omitted, such as when the speech enhancer 120 retrieves the input signal 121 or the input spectral data 123 from storage (e.g., as text data retrieved from a memory of the device 102 or received from another device). Although the system 100 is illustrated as including all components of the speech enhancer 120 in the device 102, in other implementations a second device may be added, and the second device may perform some of the operations described as being performed at the device 102.

Figure 2:
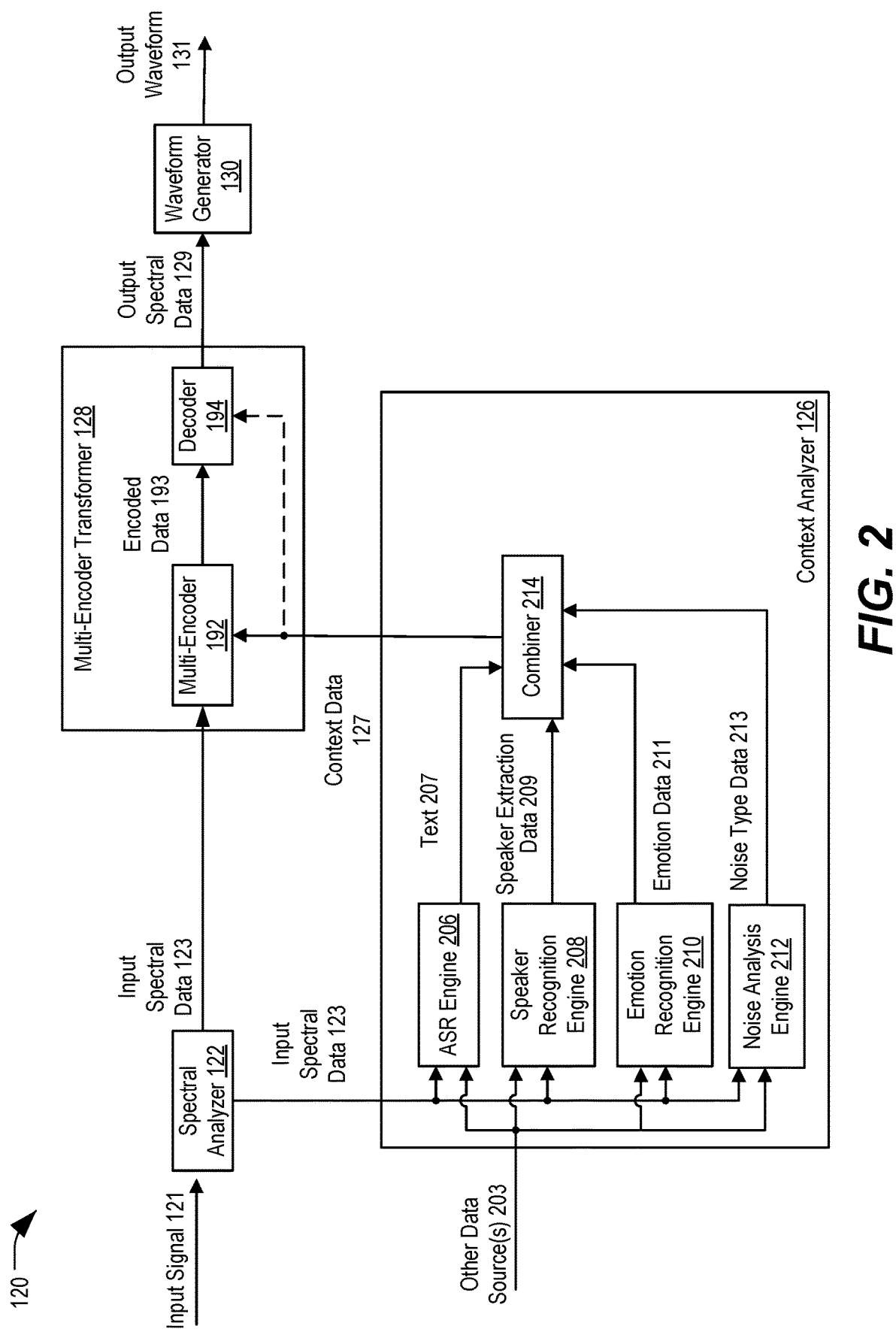
FIG. 2 is a diagram of a particular implementation of a speech enhancer of the system of FIG. 1, in accordance with some examples of the present disclosure.

Referring to FIG. 2, a particular implementation of the speech enhancer 120 is shown. The context analyzer 126 includes a plurality of context analysis engines, such as an ASR engine 206, a speaker recognition engine 208, an emotion recognition engine 210, and a noise analysis engine 212. In other implementations, the context analyzer 126 can omit one or more of the ASR engine 206, the speaker recognition engine 208, the emotion recognition engine 210, or the noise analysis engine 212, or can include one or more other context analysis engines in place of, or in addition to, one or more of the ASR engine 206, the speaker recognition engine 208, the emotion recognition engine 210, or the noise analysis engine 212.

In a particular aspect, the spectral analyzer 122 is coupled to each of the plurality of context analysis engines, and each of the plurality of context analysis engines is coupled to a combiner 214. Each of the plurality of context analysis engines is configured to generate an encoded version of the input spectral data 123 based on a corresponding context indicated by the input spectral data 123, indicated by data from one or more other data sources 203, or a combination thereof. As an example, data from the other data source 203 can include the image data 125, location data, motion data, one or more other sources of context data, or any combination thereof.

The ASR engine 206 is configured to process the input spectral data 123 and data from the other data source 203 to generate text 207 corresponding to speech that is represented by the input signal 121. In an illustrative example, the ASR engine 206 includes a neural network (e.g., a convolutional neural network (CNN)) that is configured to receive the input spectral data 123 and the data from the other data source 203 as inputs that are processed to output the text 207.

In a particular example, the speaker recognition engine 208 is configured to process the input spectral data 123 and data from the other data source 203 to generate speaker extraction data 209. In a particular example, the speaker recognition engine 208 includes one or more networks trained to identify speakers (e.g., the person 180 of FIG. 1) based on voice characteristics, visual data (e.g., face or other biometric information), or a combination thereof. In some implementations, the speaker recognition engine 208 estimates characteristics of the speaker that can be used to improve speech enhancement, such as sex, age, race, accent type, one or more other characteristics that can be used to improve speech enhancement, or a combination thereof. The speaker extraction data 209 includes data indicating an estimated identification of the speaker, one or more other characteristics of the speaker, or a combination thereof.

In a particular example, the emotion recognition engine 210 is configured to process the input spectral data 123 and data from the other data source 203 to generate emotion data 211 indicative of one or more emotions associated with the input spectral data 123. In an illustrative example, emotion can be estimated based on voice pitch, volume, speaking rate, or other aspects extracted from the input spectral data 123. Alternatively, or in addition, emotion can be estimated based on gestures or motions of the speaker (e.g., the person 180) that are extracted from the other data source 203. In a particular example, the emotion recognition engine 210 includes one or more networks trained to identify emotions based on the input spectral data 123, data from the other data source 203, or a combination thereof, and to output an indication of one or more detected emotions as the emotion data 211.

In a particular example, the noise analysis engine 212 is configured to process the input spectral data 123 and data from the other data source 203 to generate noise type data 213. In an illustrative example, an acoustic event detector can identify various noise types from the input spectral data 123. Alternatively, or in addition, one or more noise types can be estimated based on data from the other data source 203, such as video data showing a barking dog, a person clapping hands, or additional speakers that can be identified as noise sources. In a particular example, the noise analysis engine 212 includes one or more networks trained to identify noise types based on the input spectral data 123, data from the other data source 203, or a combination thereof, and to output an indication of one or more detected noise types as the noise type data 213.

According to some aspects, the combiner 214 includes a neural network (e.g., a CNN), a linear projection layer, or both. In a particular example, the text 207, the speaker extraction data 209, the emotion data 211, the noise type data 213, or a combination thereof, correspond to an input embedding of the neural network (e.g., a CNN). The neural network of the combiner 214 processes the input embedding (e.g., an encoded input representation) to generate an output embedding. The neural network provides the output embedding to the linear projection layer and the linear projection layer generates the context data 127 by performing a linear projection on the output embedding of the neural network. In a particular aspect, the multi-encoder transformer 128 does not include any convolution, and convolution is performed via use of the combiner 214 to process the text 207, the speaker extraction data 209, the emotion data 211, the noise type data 213, or a combination thereof. The combiner 214 provides the context data 127 to the multi-encoder 192. According to other aspects, the combiner 214 performs a concatenation or other combination of the text 207, the speaker extraction data 209, the emotion data 211, and the noise type data 213 and outputs the resulting context data 127 for further processing at the multi-encoder 192.

The multi-encoder 192 receives and processes the input spectral data 123 and the context data 127 to generate the encoded data 193. In an example, the multi-encoder 192 processes the input spectral data 123 to generate first encoded data independent of the context data 127, and processes the context data 127 to generate second encoded data corresponding to contextual aspects associated with the input signal 121, as further described with reference to FIG. 3 and FIG. 4. In some implementations, the combiner 214 also provides the context data 127 to the decoder 194, and the decoder 194 processes the encoded data 193 based on the context data 127 to generate the output spectral data 129.

Figure 3:
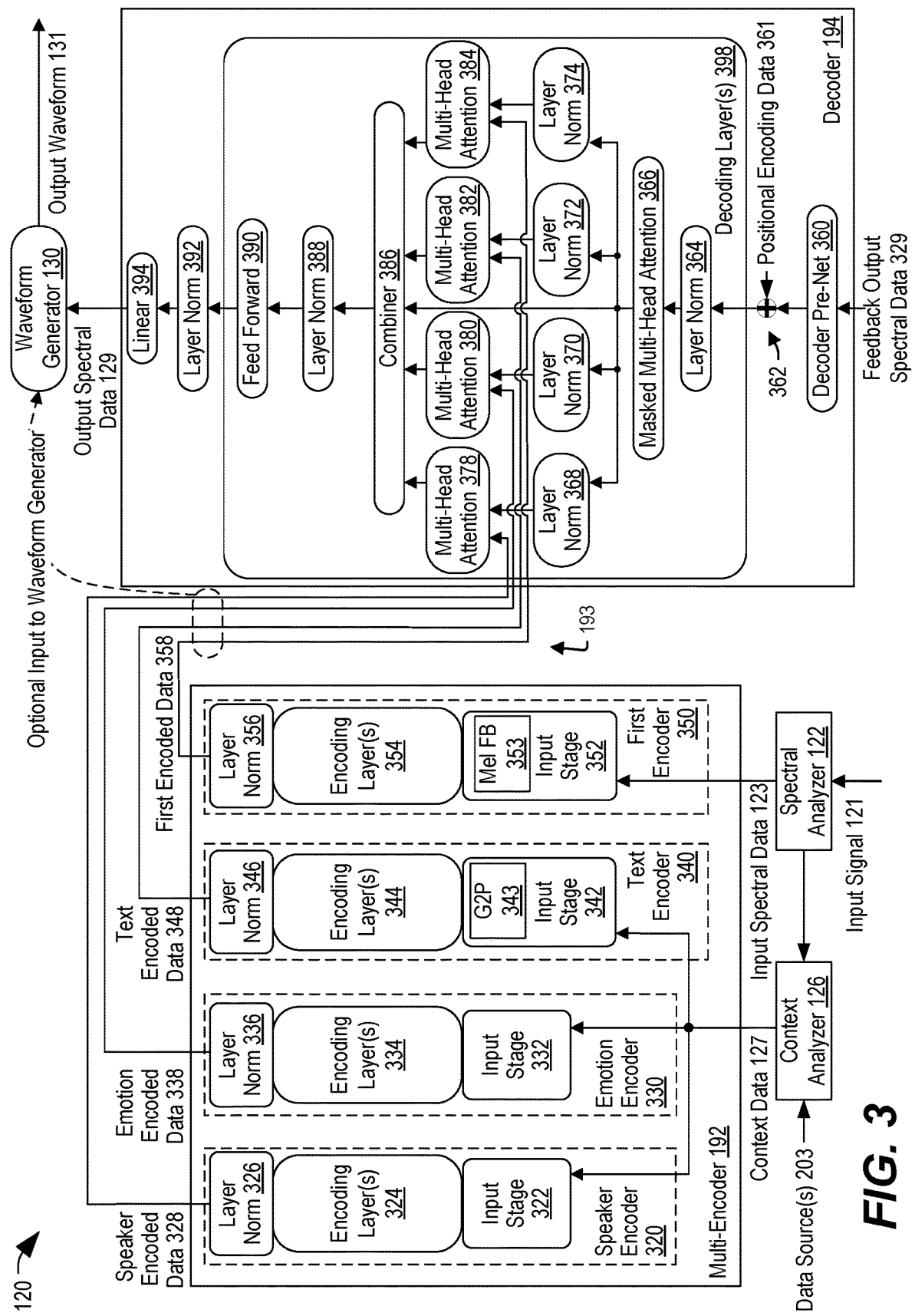
FIG. 3 is a diagram of another particular implementation of the speech enhancer of FIG. 1, in accordance with some examples of the present disclosure.

Referring to FIG. 3, a particular implementation of the speech enhancer 120 is shown. The multi-encoder 192 includes a first encoder 350 and context encoders for multiple contextual aspects of the speech in the input signal 121. For example, the multi-encoder 192 includes a speaker encoder 320, an emotion encoder 330, a text encoder 340, or a combination thereof. Although the multi-encoder 192 is illustrated as including encoders for three context aspects (i.e., the speaker encoder 320, the emotion encoder 330, and the text encoder 340), in other implementations the multi-encoder 192 includes encoders for fewer than three context aspects or includes other context encoders (e.g., a noise type encoder) in addition to, or in place of, one or more of the speaker encoder 320, the emotion encoder 330, and the text encoder 340.

Each encoder of the multi-encoder 192 is configured to generate encoded data by processing input data, as further described with reference to FIG. 5, independently of the other encoders of the multi-encoder 192. For example, the first encoder 350 is configured to process the input spectral data 123 to generate first encoded data 358. The speaker encoder 320 is configured to process the context data 127 to generate speaker encoded data 328. The emotion encoder 330 is configured to process the context data 127 to generate emotion encoded data 338. The text encoder 340 is configured to process the context data 127 to generate text encoded data 348. Since each of the encoders of the multi-encoder 192 operates independently of the other encoders of the multi-encoder 192, each of the encoders can be specifically tuned based on a loss metric to improve accuracy of the output waveform 131.

Each encoder of the multi-encoder 192 includes an input stage, one or more encoding layers, and a normalization layer (layer norm), as further described with reference to FIG. 5. For example, the first encoder 350 includes an input stage 352, one or more encoding layers 354, and a layer norm 356. The speaker encoder 320 includes an input stage 322, one or more encoding layers 324, and a layer norm 326. The emotion encoder 330 includes an input stage 332, one or more encoding layers 334, and a layer norm 336. The text encoder 340 includes an input stage 342, one or more encoding layers 344, and a layer norm 346.

In some implementations, each of the encoders 320, 330, 340, and 350 are configured and operate as described with reference to an encoder 500 depicted in FIG. 5. In FIG. 5, the encoder 500 includes an input stage 522, one or more encoding layers 554, and a layer norm 526. Each encoding layer of the one or more encoding layers 554 includes an attention layer and a feed forward layer. The attention layer includes an attention network, such as a multi-head attention 564. The feed forward layer includes a feed forward neural network, such as a feed forward 570 (e.g., a fully connected feed forward neural network). In a particular example, the attention layer includes a layer norm 562 coupled via the multi-head attention 564 to a combiner 566. The feed forward layer includes a layer norm 568 coupled via the feed forward 570 to a combiner 572. The attention layer is coupled to the feed forward layer. For example, the combiner 566 is coupled to the layer norm 568 and to the combiner 572.

The one or more encoding layers 554 including a single encoding layer is provided as an illustrative example. In other examples, the one or more encoding layers 554 include multiple encoding layers with an output of the input stage 522 coupled to the attention layer (e.g., the layer norm 562)

of an initial encoding layer, the feed forward layer (e.g., the combiner 572) of each previous encoding layer coupled to the attention layer (e.g., the layer norm 562) of a subsequent encoding layer, and the feed forward layer (e.g., the combiner 572) of a last encoding layer coupled to the layer norm 526.

The input stage 522 receives input data 521. In a particular example, the encoder 500 corresponds to the first encoder 350 of FIG. 3. For example, the input data 521 corresponds to the input spectral data 123, the input stage 522 corresponds to the input stage 352, the one or more encoding layers 554 correspond to the one or more encoding layers 354, and the layer norm 526 corresponds to the layer norm 356. In a particular implementation, the input stage 352 includes an encoder pre-net (e.g., a CNN, a linear projection layer, or both) that processes the input spectral data 123 to generate an output. For example, the encoder pre-net of the first encoder 350 is used to add convolution. The input stage 352 is configured to process an output of the encoder pre-net. For example, the input stage 352 is configured to generate an output by combining the output of the encoder pre-net with positional encoding data.

In a particular aspect, the encoder 500 corresponds to the speaker encoder 320, the emotion encoder 330, or the text encoder 340; the input data 521 corresponds to the context data 127; and the input stage 522 is configured to generate an output by processing the context data 127. For example, the input stage 522 is configured to generate an output by combining the context data 127 with positional encoding data.

In a particular example, the encoder 500 corresponds to the speaker encoder 320. To illustrate, the input stage 522 corresponds to the input stage 322, the one or more encoding layers 554 correspond to the one or more encoding layers 324, and the layer norm 526 corresponds to the layer norm 326. In another particular example, the encoder 500 corresponds to the emotion encoder 330. To illustrate, the input stage 522 corresponds to the input stage 332, the one or more encoding layers 554 correspond to the one or more encoding layers 334, and the layer norm 526 corresponds to the layer norm 336. In another particular example, the encoder 500 corresponds to the text encoder 340. To illustrate, the input stage 522 corresponds to the input stage 342, the one or more encoding layers 554 correspond to the one or more encoding layers 344, and the layer norm 526 corresponds to the layer norm 346.

The output of the input stage 522 is provided, subsequent to normalization by the layer norm 562, to the multi-head attention 564. The multi-head attention 564 can build a context vector from encoded data from different encoders using different attention heads. For example, the multi-head attention 564 includes attention heads that process the input to the multi-head attention 564 in parallel. To illustrate, the input is multiplied by a first matrix, a second matrix, and a third matrix to generate a first Query vector, a first Key vector, and a first Value vector, respectively. The first Query vector, the first Key vector, and the first Value vector are processed by a first attention head. The input is multiplied by a fourth matrix, a fifth matrix, and a sixth matrix to generate a second Query vector, a second Key vector, and a second Value vector, respectively. The second Query vector, the second Key vector, and the second Value vector are processed by a second attention head in parallel or concurrently with the first attention head processing the first Query vector, the first Key vector, and the first Value vector.

In a particular aspect, an output of an attention head corresponds to the following Equation:

$$Z = \text{softmax}\left(\frac{Q \times K^T}{\sqrt{d_k}}\right)V,$$

where Z corresponds to an output of the attention head, Q corresponds to the Query vector, x corresponds to the multiplication operator, K corresponds to the Key vector, V corresponds to the Value vector, $d_k$ corresponds to the dimension of the Key vectors, and softmax corresponds to a normalization operation.

The independent outputs of the attention heads are concatenated and linearly transformed to generate an output of the multi-head attention 564. The combiner 566 generates an output by combining the input to the layer norm 562 and the output of the multi-head attention 564.

The output of the combiner 566 is provided, subsequent to normalization by the layer norm 568, to the feed forward 570 (e.g., a fully connected feed forward neural network). In a particular example, the feed forward 570 includes a first linear transformation layer coupled via a rectified linear unit (ReLU) layer to a second linear transformation layer. The feed forward 570 generates an output by processing the normalized output of the combiner 566.

The combiner 572 generates an output by combining the output of the combiner 566 with the output of the feed forward 570. In a particular aspect, the layer norm 526 generates encoded data 528 by applying normalization to the output of the combiner 572 (e.g., of a last encoding layer of the one or more encoding layers 554). For example, applying normalization includes adjusting each value of the output (e.g., an output vector) of the combiner 572 to be within a particular range.

Returning to FIG. 3, the first encoder 350 is configured to encode the input spectral data 123 independently of the context data 127 to generate the first encoded data 358. Each of the speaker encoder 320, the emotion encoder 330, and the text encoder 340 is configured to encode the context data 127 to generate encoded data. Each of the encoders 320, 330, 340, 350 can include additional processing to assist in encoding. In an illustrative example, the input stage 352 of the first encoder 350 includes a Mel filter bank (FB) 353 configured to filter the input spectral data 123, and the input stage 342 of the text encoder 340 includes a grapheme-to-phoneme (G2P) convertor 343 configured to process the text (e.g., the text 207 of FIG. 2) in the context data 127.

In a particular aspect, the speaker encoder 320, the emotion encoder 330, and the text encoder 340 differ from each other in the weights or matrices used by the corresponding multi-head attention 564. For example, the multi-head attention 564 of the speaker encoder 320 uses a first set of matrices indicating a first set of weights to generate Query vectors, Key vectors, and Value vectors. The multi-head attention 564 of the emotion encoder 330 uses a second set of matrices indicating a second set of weights to generate Query vectors, Key vectors, and Value vectors. Similarly, the multi-head attention 564 of the text encoder 340 uses a third set of matrices indicating a third set of weights to generate Query vectors, Key vectors, and Value vectors.

The multi-encoder 192 provides the encoded data 193 to the decoder 194. For example, the encoded data 193 includes the first encoded data 358 that is independent of the image data 125. In a particular aspect, the encoded data 193 also includes second encoded data (e.g., the speaker encoded data 328, the emotion encoded data 338, the text encoded data 348, or a combination thereof) that is based on the context data 127.

The decoder 194 includes a decoder pre-net 360, a combiner 362, one or more decoding layers 398, a layer norm 392, a linear transform layer (linear) 394, or a combination thereof. Each decoding layer of the one or more decoding layers 398 includes a masked attention layer, an attention layer, and a feed forward layer. For example, the masked attention layer includes a layer norm 364 coupled via a masked multi-head attention 366 (e.g., a masked decoder attention network) to a plurality of normalization layers (layer norms), such as a layer norm 368, a layer norm 370, a layer norm 372, a layer norm 374, or a combination thereof. The attention layer includes a plurality of decoder attention networks coupled via a combiner 386 to a layer norm 388. For example, the plurality of decoder attention networks (e.g., decoder multi-head attention networks) includes a multi-head attention 378, a multi-head attention 380, a multi-head attention 382, a multi-head attention 384, or a combination thereof. The feed forward layer includes a feed forward 390 (e.g., a fully connected feed forward neural network).

The masked attention layer is coupled to the attention layer. For example, each of the plurality of layer norms of the masked attention layer is coupled to a corresponding multi-head attention network of the attention layer. For example, the layer norm 368, the layer norm 370, the layer norm 372, and the layer norm 374 are coupled to the multi-head attention 378, the multi-head attention 380, the multi-head attention 382, and the multi-head attention 384, respectively. The masked multi-head attention 366 is coupled via the combiner 386 to the layer norm 388. The attention layer is coupled to the feed forward layer. For example, the layer norm 388 is coupled to the feed forward 390.

The combiner 362 is coupled to a decoding layer of the one or more decoding layers 398. For example, the combiner 362 is coupled to the layer norm 364 of the decoding layer (e.g., an initial decoding layer of the decoding layers 398). A decoding layer of the one or more decoding layers 398 is coupled to the layer norm 392. For example, the feed forward 390 of the decoding layer (e.g., a last decoding layer of the decoding layers 398) is coupled to the layer norm 392.

In a particular aspect, the decoder pre-net 360 receives feedback output spectral data 329 corresponding to output spectral data 129 generated by the decoder 194 for a previous time step. The decoder pre-net 360 includes a neural network (e.g., a CNN) that processes the feedback output spectral data 329 to generate an output. In a particular aspect, the decoder pre-net 360 adds convolution. In a particular aspect, the combiner 362 generates an output by combining the output of the decoder pre-net 360 and positional encoding data 361.

The output of the combiner 362 is processed by a decoding layer of the one or more decoding layers 398. For example, the output of the combiner 362 is provided, subsequent to normalization by the layer norm 364 of the decoding layer, to the masked multi-head attention 366. In a particular aspect, the masked multi-head attention 366 masks future positions in the input to the masked multi-head attention 366. The masked multi-head attention 366 generates Query vectors, Key vectors, and Value vectors from the masked version of the input to the masked multi-head attention 366. Each attention head of the masked multi-head attention 366 processes a Query vector, a Key vector, and a Value vector to generate an output. The independent outputs of the attention heads of the masked multi-head attention 366 are concatenated and linearly transformed to generate an output of the masked multi-head attention 366.

The output of the masked multi-head attention 366 is provided to the combiner 386 and, subsequent to normalization, to the plurality of multi-head attentions of the decoding layer. For example, the output of the masked multi-head attention 366 is provided subsequent to normalization by the layer norm 368, the layer norm 370, the layer norm 372, and the layer norm 374 to the multi-head attention 378, the multi-head attention 380, the multi-head attention 382, and the multi-head attention 384, respectively.

Each of the plurality of multi-head attentions of the decoding layer is configured to process the normalized version of the output of the masked multi-head attention 366 and the encoded data received from the corresponding encoder of the multi-encoder 192. For example, each of the plurality of multi-head attentions of the decoding layer processes (e.g., generates and processes) Query vectors that are based on the normalized version of the output of the masked multi-head attention 366 and processes (e.g., generates and processes) Key vectors and Value vectors that are based on the encoded data received from the corresponding encoder of the multi-encoder 192. To illustrate, the multi-head attention 384 is configured to process Query vectors that are based on the output of the layer norm 374 and to process Key vectors and Value vectors that are based on the first encoded data 358. The multi-head attention 378, the multi-head attention 380, and the multi-head attention 382 are configured to process the speaker encoded data 328, the emotion encoded data 338, and the text encoded data 348, respectively, and the output of the layer norm 368, the layer norm 370, and the layer norm 372, respectively. For example, the multi-head attention 378 processes Query vectors that are based on the output of the layer norm 368 and processes Key vectors and Value vectors that are based on the speaker encoded data 328.

The combiner 386 generates an output by combining the output of the masked multi-head attention 366 with an output of the multi-head attention 378, an output of the multi-head attention 380, an output of the multi-head attention 382, an output of the multi-head attention 384, or a combination hereof. The output of the combiner 386 is provided, subsequent to normalization by the layer norm 388, to the feed forward 390 of the decoding layer.

The output of the feed forward 390 of a particular decoding layer (e.g., a last decoding layer) of the one or more decoding layers 398 is provided, subsequent to normalization by the layer norm 392 and linear transformation by the linear 394, to the waveform generator 130 as the output spectral data 129. In a particular aspect, the waveform generator 130 performs speech synthesis based on the output spectral data 129, the encoded data 193, or a combination thereof, to generate the output waveform 131. The output spectral data 129 is provided to the decoder pre-net 360 as the feedback output spectral data 329 for a subsequent time step.

The one or more decoding layers 398 including a single decoding layer is provided as an illustrative example. In other examples, the one or more decoding layers 398 include multiple decoding layers with an output of the combiner 362 coupled to the layer norm 364 of an initial decoding layer, the feed forward 390 of each previous decoding layer coupled to the layer norm 364 of a subsequent encoding layer, and the feed forward 390 of a last decoding layer coupled to the layer norm 392. The last encoding layer of the multi-encoder 192 provides the encoded data 193 to the plurality of multi-head attentions of each of the one or more decoding layers 398.

Figure 4:
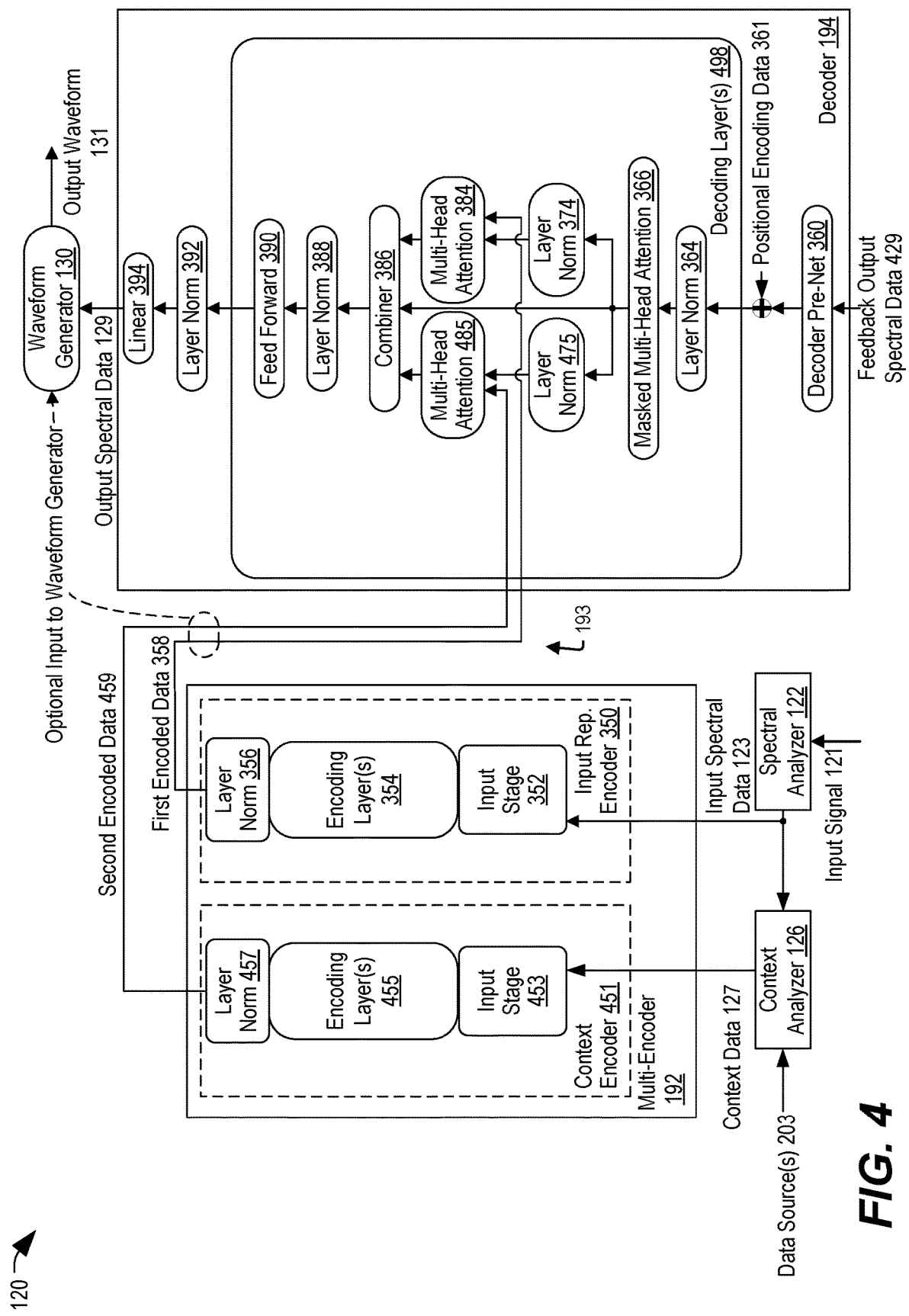
FIG. 4 is a diagram of another particular implementation of the speech enhancer of FIG. 1, in accordance with some examples of the present disclosure.
Figure 5:
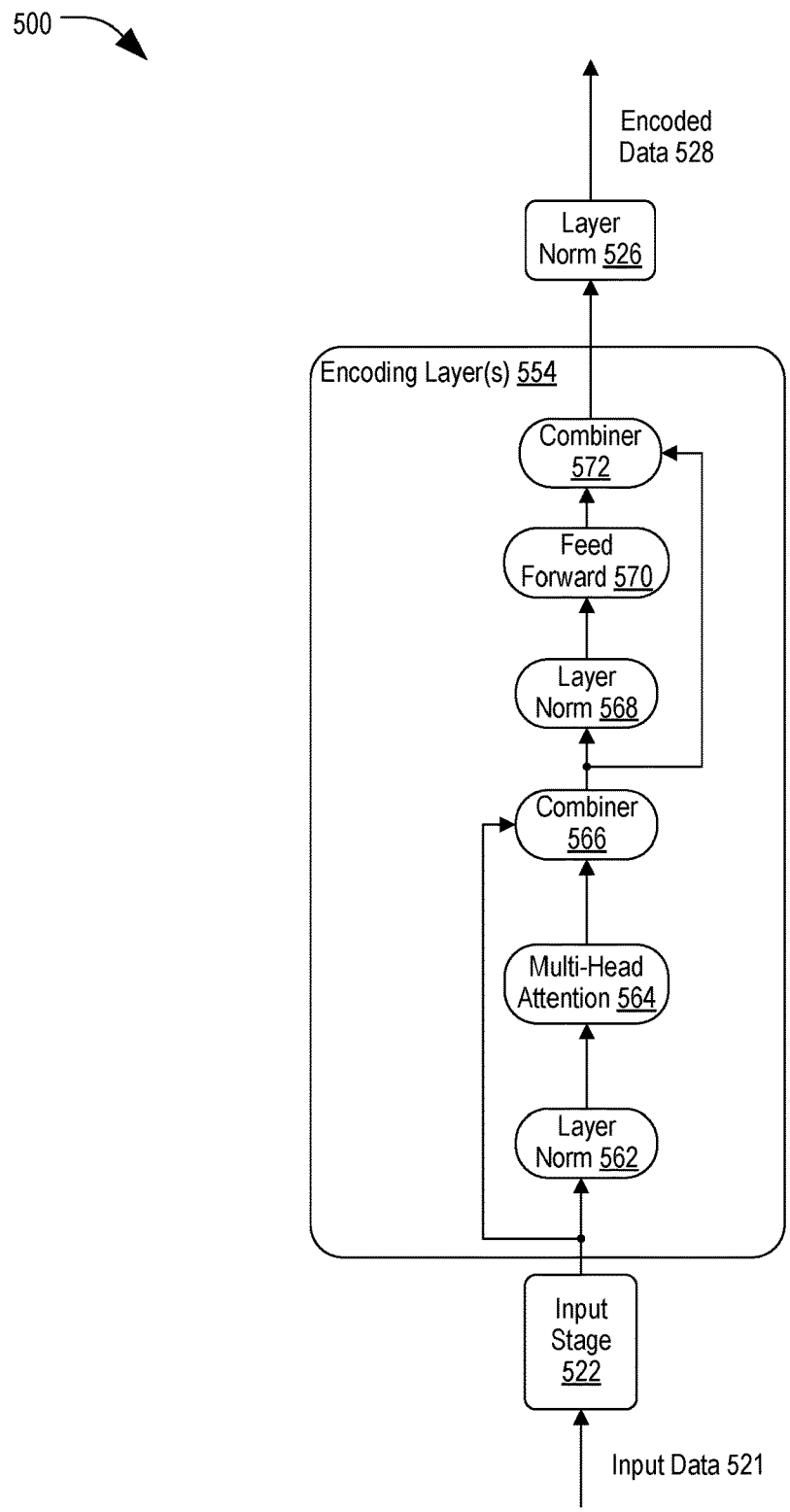
FIG. 5 is a diagram of an illustrative aspect of an encoder of the speech enhancer of FIG. 1, in accordance with some examples of the present disclosure.

Referring to FIG. 4, a particular implementation of the speech enhancer 120 is shown. The multi-encoder 192 includes a context encoder 451 for the context data 127 instead of a separate encoder for each aspect of the context data 127 (e.g., text, speaker, emotion, noise type). For example, the context encoder 451 includes an input stage 453, one or more encoding layers 455, and a layer norm 457. In a particular aspect, the encoder 500 of FIG. 5 is an example of an implementation of the context encoder 451. For example, the input stage 522 corresponds to the input stage 453, the one or more encoding layers 554 correspond to the one or more encoding layers 455, and the layer norm 526 corresponds to the layer norm 457.

The context encoder 451 receives the context data 127 (e.g., an input embedding vector) from the context analyzer 126. In a particular aspect, the input stage 453 generates an output by combining the context data 127 with positional encoding data. The output of the input stage 453 is processed by the one or more encoding layers 455, as described with reference to the one or more encoding layers 554 of FIG. 5. The output of the one or more encoding layers 455 is provided, subsequent to normalization by the layer norm 457, as second encoded data 459 to the decoder 194. For example, the encoded data 193 includes the first encoded data 358 and the second encoded data 459.

The decoder 194 includes one or more decoding layers 498 that include the masked multi-head attention 366 coupled, via normalization layers (layer norms), to two multi-head attentions. For example, the masked multi-head attention 366 is coupled via a layer norm 475 to a multi-head attention 485 and via the layer norm 374 to the multi-head attention 384. The combiner 386 is coupled to the masked multi-head attention 366, the multi-head attention 485, and the multi-head attention 384.

An output of the masked multi-head attention 366 is provided, subsequent to normalization by the layer norm 475, to the multi-head attention 485. The context encoder 451 provides the second encoded data 459 to the multi-head attention 485. The multi-head attention 485 generates Query vectors based on the normalized output of the masked multi-head attention 366 and generates Key vectors and Value vectors based on the second encoded data 459. Each attention head of the multi-head attention 485 processes a Query vector, a Key vector, and a Value vector to generate an output. Outputs of each of the attention heads of the multi-head attention 485 are concatenated and linearly transformed to generate an output of the multi-head attention 485. The combiner 386 generates an output by combining the output of the masked multi-head attention 366 with an output of the multi-head attention 485, an output of the multi-head attention 384, or both.

Figure 6:
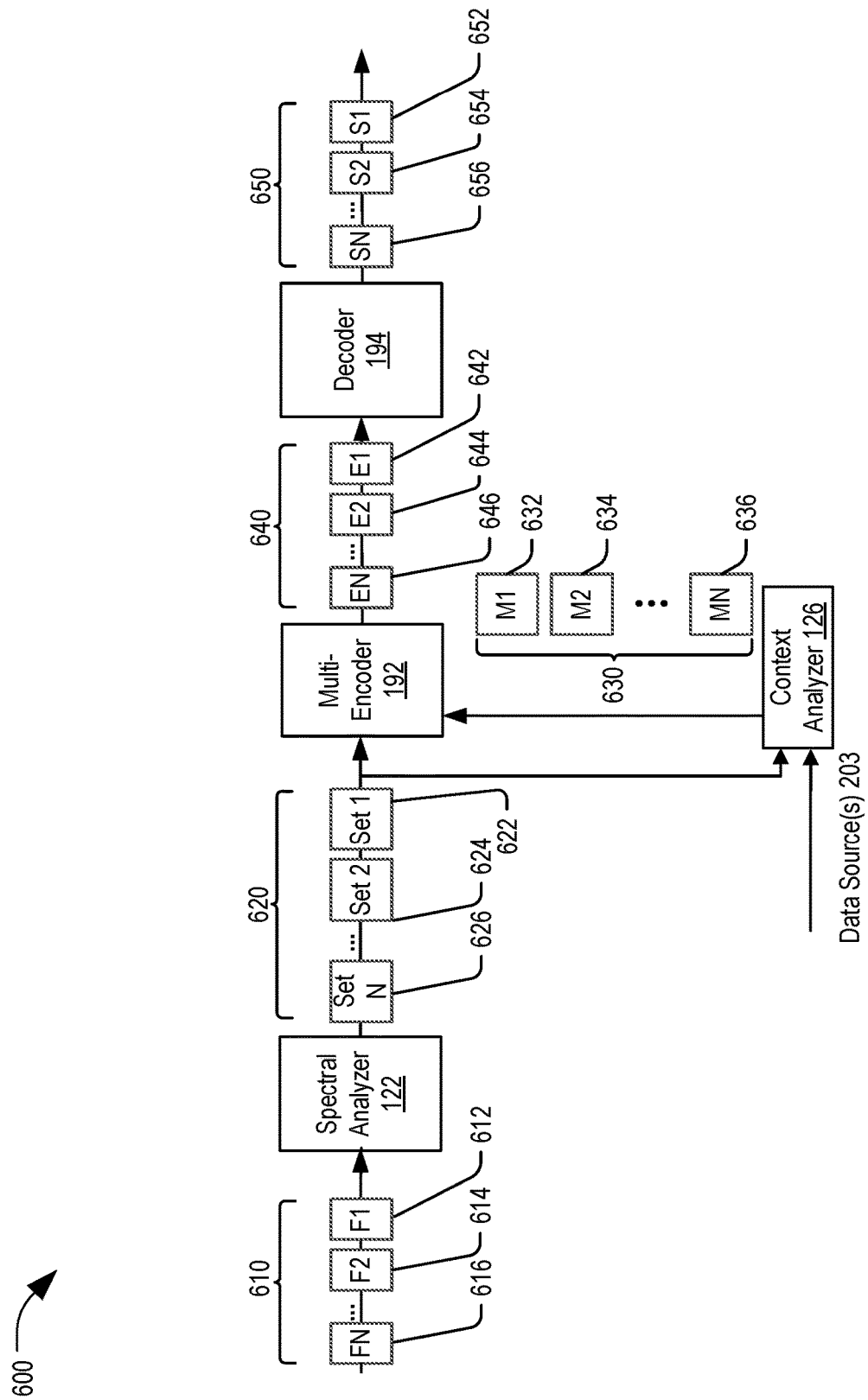
FIG. 6 is a diagram of an illustrative aspect of operations of components of the system of FIG. 1, in accordance with some examples of the present disclosure.

FIG. 6 is a diagram of an illustrative aspect of operation of components of the system of FIG. 1. The spectral analyzer 122 is configured to receive a sequence 610 of audio data samples, such as a sequence of successively captured frames of the input signal 121, illustrated as a first frame (F1) 612, a second frame (F2) 614, and one or more additional frames including an Nth frame (FN) 616 (where N is an integer greater than two). The spectral analyzer 122 is configured to output a sequence 620 of sets of input representation data, such as a sequence of sets of the input spectral data 123, including a first set 622, a second set 624, and one or more additional sets including an Nth set 626.

The context analyzer 126 is configured to receive the sequence 620 of sets of the input representation data and generate a sequence 630 of sets of context data based on the sequence 620 and the data source 203. The sequence 630 includes a first set (M1) 632, a second set (M2) 634, and one or more additional sets including an Nth set (MN) 636. The multi-encoder 192 is configured to receive the sequence 620 and the sequence 630 and to generate a sequence 640 of encoded sets of data, such as a first encoded set (E1) 642, a second encoded set (E2) 644, and one or more additional encoded sets including an Nth set (EN) 646. The decoder 194 is configured to receive the sequence 640 of encoded sets and generate a sequence 650 of spectral data, including first spectral data (S1) 652, second spectral data (S2) 654, and one or more additional sets of spectral data including Nth spectral data (SN) 656.

During operation, the spectral analyzer 122 processes the first frame (F1) 612 to generate the first set 622 of the input spectral data 123 and the context analyzer 126 processes the first set 622 to generate the first set (M1) 632 of the context data 127. The multi-encoder 192 processes the first set 622 of the input spectral data 123 and the first set (M1) 632 of the context data 127 to generate the first encoded set (E1) 642 of the encoded data 193. The decoder 194 processes the first encoded set (E1) 642 of the encoded data 193 to generate the first spectral data (S1) 652 of the output spectral data 129. A subsequent encoded set (e.g., the second encoded set (E2) 644) is processed by the decoder 194 at least partially based on the first spectral data (S1) 652. Such processing continues, including the spectral analyzer 122 processing the Nth frame 616 to generate the Nth set 626 of the input spectral data 123, the context analyzer 126 processing the Nth set 626 of the input spectral data 123 to generate the Nth set (MN) 636 of the context data 127, the multi-encoder 192 processing the Nth set 626 of the input spectral data 123 and the Nth set (MN) 636 of the context data 127 to generate the Nth encoded set (EN) 646 of the encoded data 193, and the decoder 194 processing the Nth encoded set (EN) 646 of the encoded data 193 to generate the Nth spectral data (SN) 656. The Nth spectral data (SN) 656 is based on the Nth set 626 of feature data and at least partially based on one or more of the previous sets of feature data of the sequence 620. By decoding based on one or more prior sets of spectral data, speech enhancement by the decoder 194 may be improved for speech signals that may span multiple frames of audio data.

Figure 7:
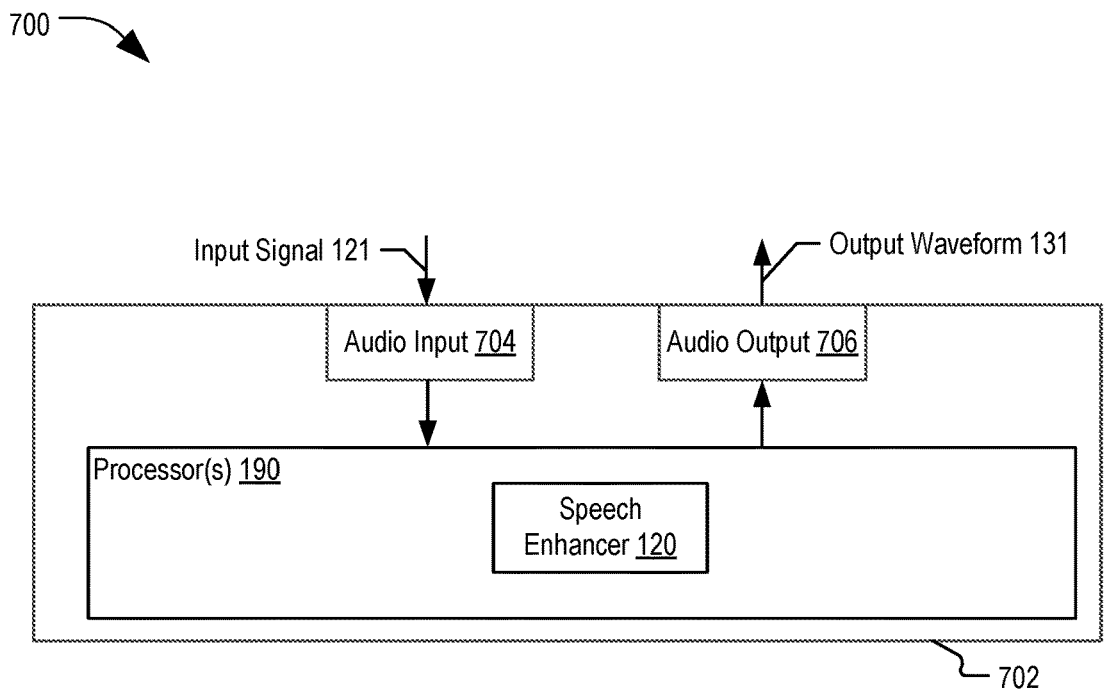
FIG. 7 illustrates an example of an integrated circuit operable to generate enhanced speech, in accordance with some examples of the present disclosure.
Figure 11:
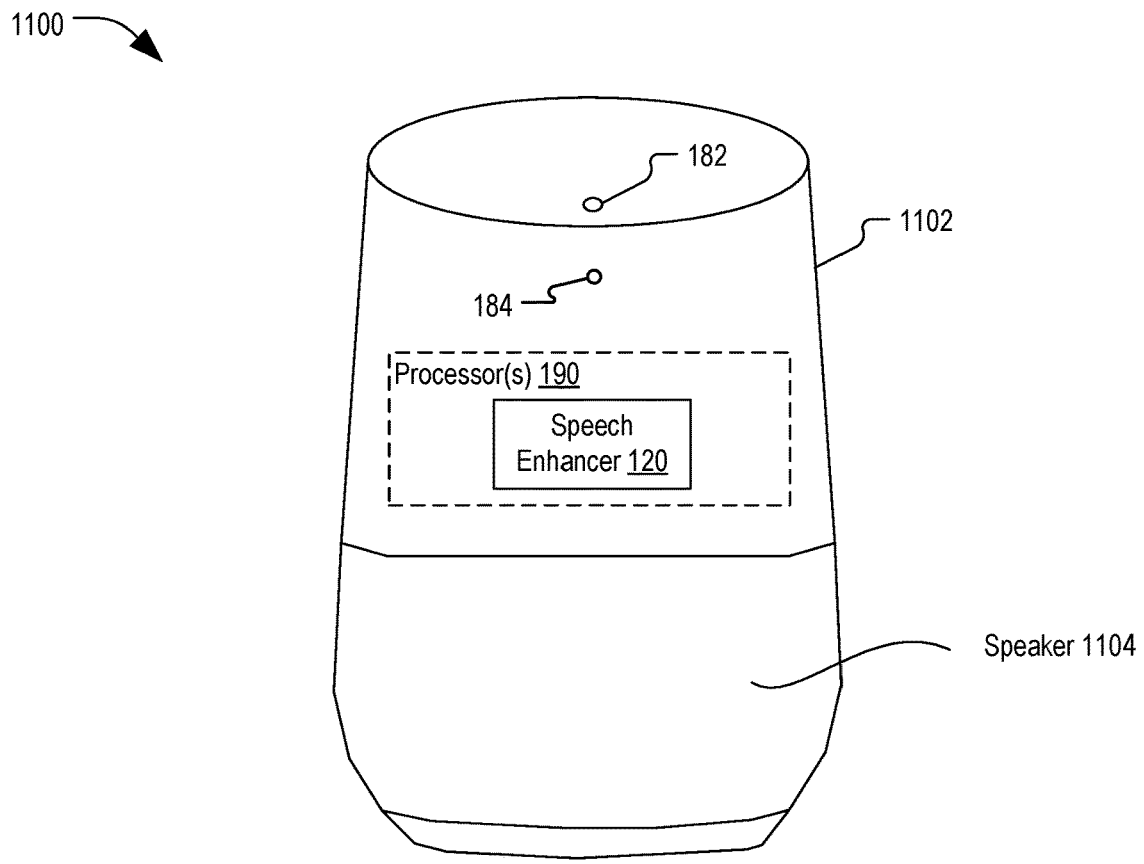
FIG. 11 is a diagram of a voice-controlled speaker system operable to generate enhanced speech, in accordance with some examples of the present disclosure.
Figure 12:
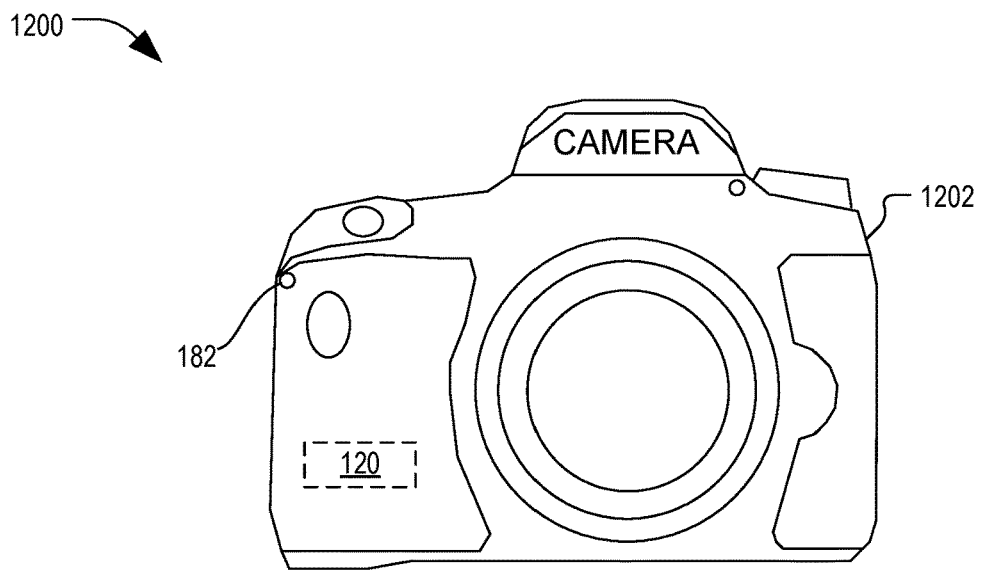
FIG. 12 is a diagram of a camera operable to generate enhanced speech, in accordance with some examples of the present disclosure.
Figure 13:
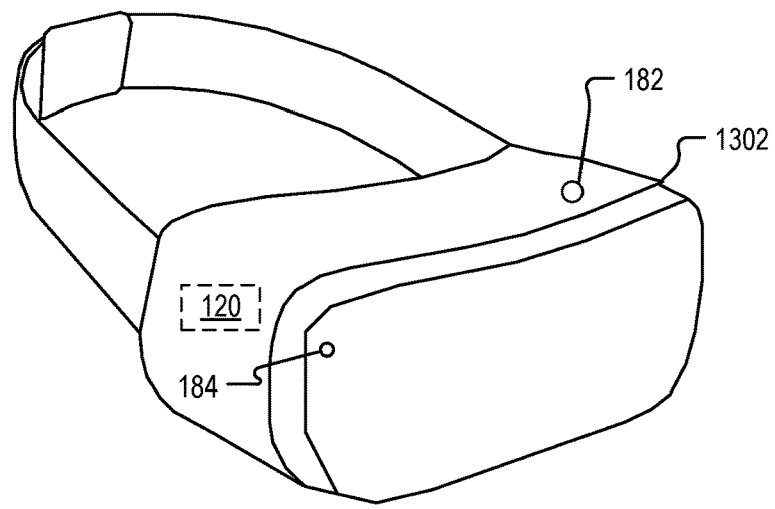
FIG. 13 is a diagram of a headset, such as a virtual reality or augmented reality headset, operable to generate enhanced speech, in accordance with some examples of the present disclosure.
Figure 14:
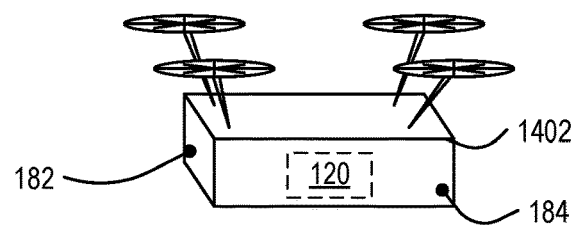
FIG. 14 is a diagram of a first example of a vehicle operable to generate enhanced speech, in accordance with some examples of the present disclosure.
Figure 15:
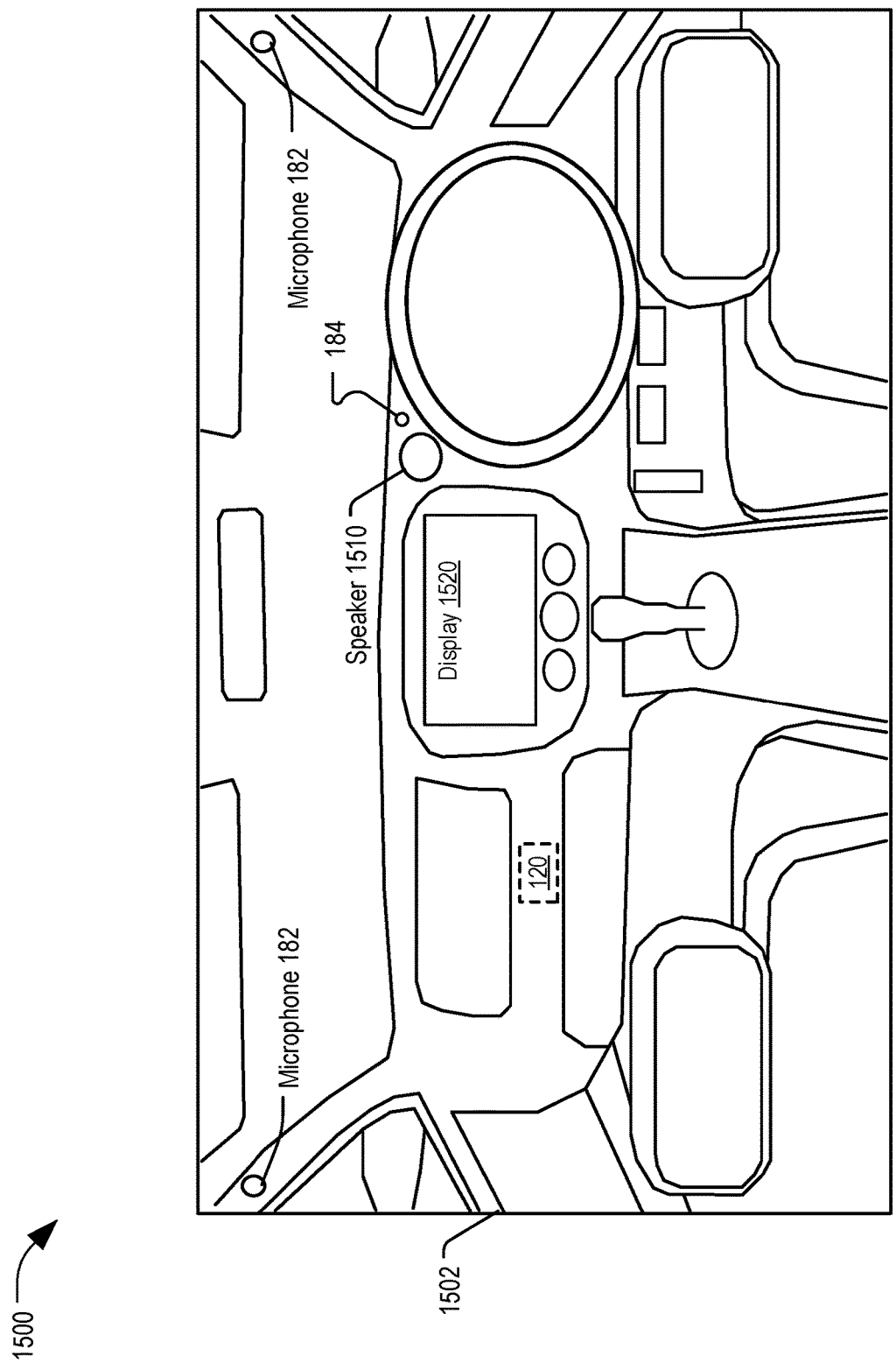
FIG. 15 is a diagram of a second example of a vehicle operable to generate enhanced speech, in accordance with some examples of the present disclosure.

FIG. 7 depicts an implementation 700 of the device 102 as an integrated circuit 702 that includes the processor 190. The integrated circuit 702 also includes an audio input 704, such as one or more bus interfaces, to enable the input signal 121 to be received for processing. The integrated circuit 702 also includes an audio output 706, such as a bus interface, to enable sending of an output signal, such as the output waveform 131. The integrated circuit 702 enables implementation of speech enhancement as a component in a system that includes microphones, such as a mobile phone or tablet as depicted in FIG. 8, a headset as depicted in FIG. 9, a wearable electronic device as depicted in FIG. 10, a voice-controlled speaker system as depicted in FIG. 11, a camera as depicted in FIG. 12, a virtual reality headset or an augmented reality headset as depicted in FIG. 13, or a vehicle as depicted in FIG. 14 or FIG. 15.

Figure 8:
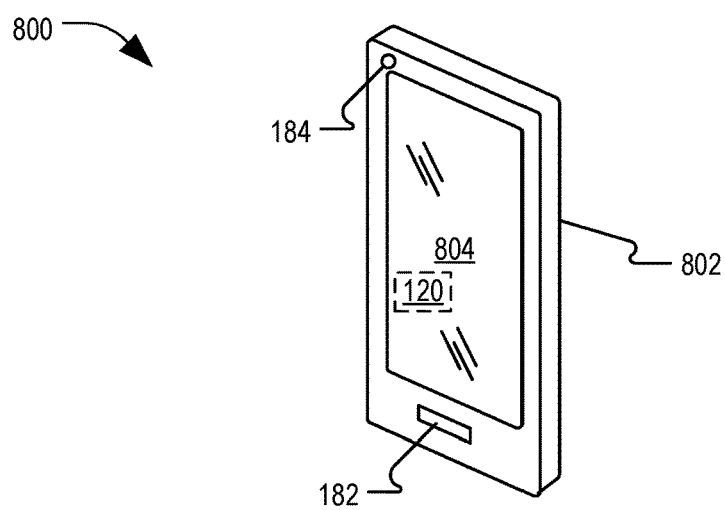
FIG. 8 is a diagram of a mobile device operable to generate enhanced speech, in accordance with some examples of the present disclosure.

FIG. 8 depicts an implementation 800 in which the device 102 includes a mobile device 802, such as a phone or tablet, as illustrative, non-limiting examples. The mobile device 802 includes the microphone 182, one or more other sensors, illustrated as the camera 184, and a display screen 804. Components of the processor 190, including the speech enhancer 120, are integrated in the mobile device 802 and are illustrated using dashed lines to indicate internal components that are not generally visible to a user of the mobile device 802. In a particular example, the speech enhancer 120 operates to generate enhanced speech, which is then processed to perform one or more operations at the mobile device 802, such as to launch a graphical user interface or otherwise display other information associated with the user's speech at the display screen 804 (e.g., via an integrated "smart assistant" application).

Figure 9:
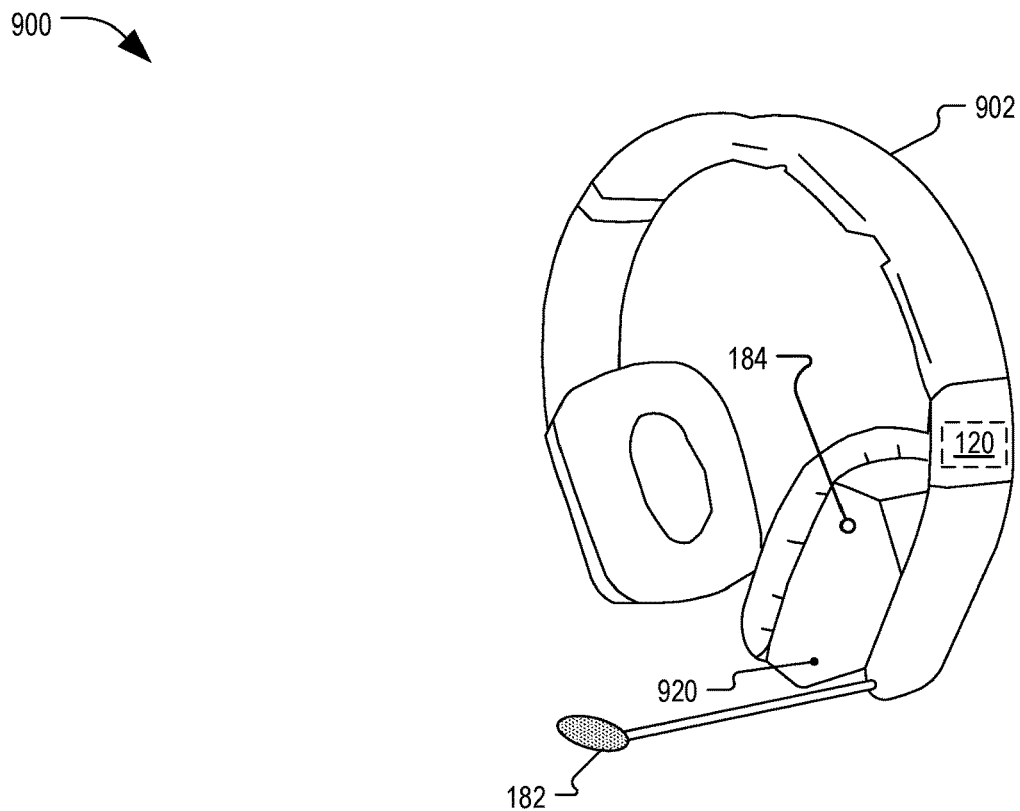
FIG. 9 is a diagram of a headset operable to generate enhanced speech, in accordance with some examples of the present disclosure.

FIG. 9 depicts an implementation 900 in which the device 102 includes a headset device 902. The headset device 902 includes the microphone 182 and one or more other sensors, illustrated as the camera 184. Components of the processor 190, including the speech enhancer 120, are integrated in the headset device 902. In a particular example, the speech enhancer 120 operates to generate enhanced speech, which may cause the headset device 902 to perform one or more operations at the headset device 902, to transmit audio data corresponding to the synthesized speech to a second device (not shown), for further processing, or a combination thereof.

Figure 10:
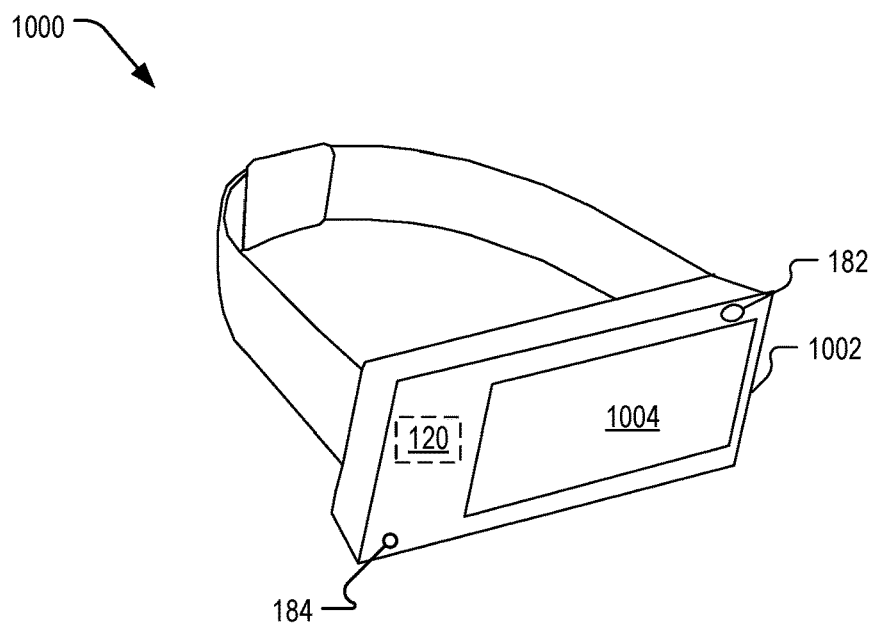
FIG. 10 is a diagram of a wearable electronic device operable to generate enhanced speech, in accordance with some examples of the present disclosure.

FIG. 10 depicts an implementation 1000 in which the device 102 includes a wearable electronic device 1002, illustrated as a "smart watch." The speech enhancer 120, the microphone 182, and one or more other sensors, illustrated as the camera 184, are integrated into the wearable electronic device 1002. In a particular example, the speech enhancer 120 operates to generate enhanced speech, which is then processed to perform one or more operations at the wearable electronic device 1002, such as to launch a graphical user interface or otherwise display other information associated with the user's speech at a display screen 1004 of the wearable electronic device 1002. To illustrate, the wearable electronic device 1002 may include a display screen that is configured to display a notification based on user speech detected by the wearable electronic device 1002. In a particular example, the wearable electronic device 1002 includes a haptic device that provides a haptic notification (e.g., vibrates) in response to detection of user voice activity or generation of synthesized speech. For example, the haptic notification can cause a user to look at the wearable electronic device 1002 to see a displayed notification indicating detection of a keyword spoken by the user. The wearable electronic device 1002 can thus alert a user with a hearing impairment or a user wearing a headset that the user's voice activity is detected.

FIG. 11 is an implementation 1100 in which the device 102 includes a wireless speaker and voice activated device 1102. The wireless speaker and voice activated device 1102 can have wireless network connectivity and is configured to execute an assistant operation. The processor 190 including the speech enhancer 120, the microphone 182, one or more other sensors, illustrated as the camera 184, or a combination thereof, are included in the wireless speaker and voice activated device 1102. The wireless speaker and voice activated device 1102 also includes a speaker 1104. During operation, in response to receiving a verbal command and generating enhanced speech via operation of the speech enhancer 120, the wireless speaker and voice activated device 1102 can execute assistant operations, such as via execution of an integrated assistant application. The assistant operations can include adjusting a temperature, playing music, turning on lights, etc. For example, the assistant operations are performed responsive to receiving a command after a keyword or key phrase (e.g., "hello assistant").

FIG. 12 depicts an implementation 1200 in which the device 102 includes a portable electronic device that corresponds to a camera device 1202. The speech enhancer 120, the microphone 182, or a combination thereof, are included in the camera device 1202. In a particular aspect, the camera device 1202 corresponds to the camera 184 of FIG. 1. During operation, in response to receiving a verbal command and generating enhanced speech via operation of the speech enhancer 120, the camera device 1202 can execute operations responsive to spoken user commands, such as to adjust image or video capture settings, image or video playback settings, or image or video capture instructions, as illustrative examples.

FIG. 13 depicts an implementation 1300 in which the device 102 includes a portable electronic device that corresponds to a virtual reality, augmented reality, or mixed reality headset 1302. The speech enhancer 120, the microphone 182, one or more other sensors, illustrated as the camera 184, or a combination thereof, are integrated into the headset 1302. In a particular aspect, the headset 1302 includes the microphone 182 positioned to primarily capture speech of a user. Speech enhancement can be performed based on audio signals received from the microphone 182 of the headset 1302. A visual interface device is positioned in front of the user's eyes to enable display of augmented reality or virtual reality images or scenes to the user while the headset 1302 is worn. In a particular example, the visual interface device is configured to display a notification indicating user speech detected in the audio signal.

FIG. 14 depicts an implementation 1400 in which the device 102 corresponds to, or is integrated within, a vehicle 1402, illustrated as a manned or unmanned aerial device (e.g., a package delivery drone). The speech enhancer 120, the microphone 182, one or more other sensors, illustrated as the camera 184, or a combination thereof, are integrated into the vehicle 1402. Speech enhancement can be performed based on audio signals received from the microphone 182 of the vehicle 1402, such as for delivery instructions from an authorized user of the vehicle 1402.

FIG. 15 depicts another implementation 1500 in which the device 102 corresponds to, or is integrated within, a vehicle 1502, illustrated as a car. The vehicle 1502 includes the processor 190 including the speech enhancer 120. The vehicle 1502 also includes the microphone 182 and one or more other sensors, illustrated as the camera 184. The microphone 182 is positioned to capture utterances of an operator of the vehicle 1502. Speech enhancement can be performed based on audio signals received from the microphone 182 of the vehicle 1502. In some implementations, speech enhancement can be performed based on an audio signal received from interior microphones (e.g., the microphone 182), such as for a voice command from an authorized passenger. For example, the speech enhancement can be used to detect a voice command from an operator of the vehicle 1502 (e.g., to set a volume to 5 or to set a destination for a self-driving vehicle). In some implementations, speech enhancement can be performed based on an audio signal received from external microphones (e.g., the microphone 182), such as an authorized user of the vehicle. In a particular implementation, in response to receiving a verbal command and generating enhanced speech via operation of the speech enhancer 120, a voice activation system initiates one or more operations of the vehicle 1502 based on one or more keywords (e.g., "unlock," "start engine," "play music," "display weather forecast," or another voice command) detected in the output waveform 131, such as by providing feedback or information via a display 1520 or one or more speakers (e.g., a speaker 1510).

Referring to FIG. 16, a particular implementation of a method 1600 of speech enhancement is shown. In a particular aspect, one or more operations of the method 1600 are performed by at least one of the context analyzer 126, the multi-encoder 192, the decoder 194, the multi-encoder transformer 128, the speech enhancer 120, the processor 190, the device 102, the system 100 of FIG. 1, the ASR engine 206, the speaker recognition engine 208, the emotion recognition engine 210, the noise analysis engine 212, the combiner 214, the speaker encoder 320, the emotion encoder 330, the text encoder 340, the first encoder 350 of FIG. 3, the context encoder 451 of FIG. 4, the encoder 500 of FIG. 5, or a combination thereof.

The method 1600 includes obtaining input spectral data based on an input signal, the input signal representing sound that includes speech, at 1602. For example, the multi-encoder 192 receives the input spectral data 123, as described with reference to FIG. 1.

The method 1600 also includes processing, using a multi-encoder transformer, the input spectral data and context data to generate output spectral data that represents a speech enhanced version of the input signal, at 1604. For example, the multi-encoder transformer 128 processes the input spectral data 123 and the context data 127 to generate the output spectral data 129 corresponding to the output waveform 131 that represents a speech enhanced version of the input signal 121, as described with reference to FIG. 1.

The method 1600 enables improved speech enhancement by using the context data in conjunction with the input spectral data as inputs to the multi-encoder transformer, as compared to conventional systems that perform speech enhancement based on audio spectral data only.

The method 1600 of FIG. 16 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1600 of FIG. 16 may be performed by a processor that executes instructions, such as described with reference to FIG. 18.

Referring to FIG. 17, a particular implementation of a method 1700 of speech enhancement is shown. In a particular aspect, one or more operations of the method 1700 are performed by at least one of the context analyzer 126, the multi-encoder 192, the decoder 194, the multi-encoder transformer 128, the speech enhancer 120, the waveform generator 130, the processor 190, the device 102, the system 100 of FIG. 1, the ASR engine 206, the speaker recognition engine 208, the emotion recognition engine 210, the noise analysis engine 212, the combiner 214, the speaker encoder 320, the emotion encoder 330, the text encoder 340, the first encoder 350 of FIG. 3, the context encoder 451 of FIG. 4, the encoder 500 of FIG. 5, or a combination thereof.

The method 1700 includes obtaining input spectral data based on an input signal, the input signal representing sound that includes speech, at 1702. For example, the multi-encoder 192 receives the input spectral data 123, as described with reference to FIG. 1. In some implementations, obtaining the input spectral data includes obtaining the input signal from a microphone, at 1704, and processing the input signal at a spectral analyzer to generate the input spectral data, at 1706. For example, the speech enhancer 120 receives the input signal 121 from the microphone 182, and the spectral analyzer 122 processes the input signal 121 to generate the input spectral data 123, as described with reference to FIG. 1.

The method 1700 also includes obtaining context data from one or more data sources, the one or more data sources including at least one of the input signal or image data, at 1708. For example, the context analyzer 126 of FIG. 1 generates the context data 127 based on the input signal 121 and the image data 125, as described with reference to FIG. 1. As another example, the context analyzer 126 of FIG. 2 generates the context data 127 based on the input spectral data 123 and the other data source 203, as described with reference to FIG. 2. In some implementations, obtaining the context data includes generating text based on the input signal, based on the context data, or both, at 1710, generating speaker extraction data based on the input signal, based on the context data, or both, at 1712, generating emotion data based on the input signal, based on the context data, or both, at 1714, generating noise type data based on the input signal, based on the context data, or both, at 1716, or a combination thereof. For example, the ASR engine 206 generates the text 207, the speaker recognition engine 208 generates the speaker extraction data 209, the emotion recognition engine 210 generates the emotion data 211, and the noise analysis engine 212 generates the noise type data 213. In such implementations, the context data 127 includes the generated text, speaker extraction data, emotion data, and noise type data.

The method 1700 further includes processing, using a multi-encoder transformer, the input spectral data and the context data to generate output spectral data that represents a speech enhanced version of the input signal, at 1718. For example, the multi-encoder transformer 128 processes the input spectral data 123 and the context data 127 to generate the output spectral data 129, as described with reference to FIG. 1. In some implementations, processing the input spectral data and the context data includes providing the input spectral data to a first encoder of the multi-encoder transformer to generate first encoded data, at 1720. For example, the input spectral data 123 is provided to the first encoder 350 of FIG. 3 and FIG. 4. Processing the input spectral data and the context data can also include providing the context data to at least a second encoder of the multi-encoder transformer to generate second encoded data, at 1722. For example, the context data 127 is provided to the speaker encoder 320, the emotion encoder 330, and the text encoder 340 of FIG. 3 or to the context encoder 451 of FIG. 4.

Processing the input spectral data and the context data can also include providing the first encoded data and the second encoded data to a decoder attention network of the multi-encoder transformer to generate output spectral data that corresponds to a speech enhanced version of the input spectral data, at 1724. For example, the first encoded data 358, the speaker encoded data 328, the emotion encoded data 338, and the text encoded data 348 are provided to the attention network of the decoder 194 to generate the output spectral data 129, as described with reference to FIG. 3. As another example, the first encoded data 358 and the second encoded data 459 are provided to the attention network of the decoder 194 to generate the output spectral data 129, as described with reference to FIG. 4.

The method 1700 also includes processing the output spectral data to generate an output waveform corresponding to an enhanced version of the speech, at 1726. For example, the waveform generator 130 processes the output spectral data 129 to generate the output waveform 131.

The method 1700 enables enhancement of speech based on context, such as the identity and emotional state of the speaker and noise analysis. Use of contextual data enables more accurate speech enhancement to be performed as compared to conventional speech enhancement techniques.

The method 1700 of FIG. 17 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1700 of FIG. 17 may be performed by a processor that executes instructions, such as described with reference to FIG. 18.

Figure 18:
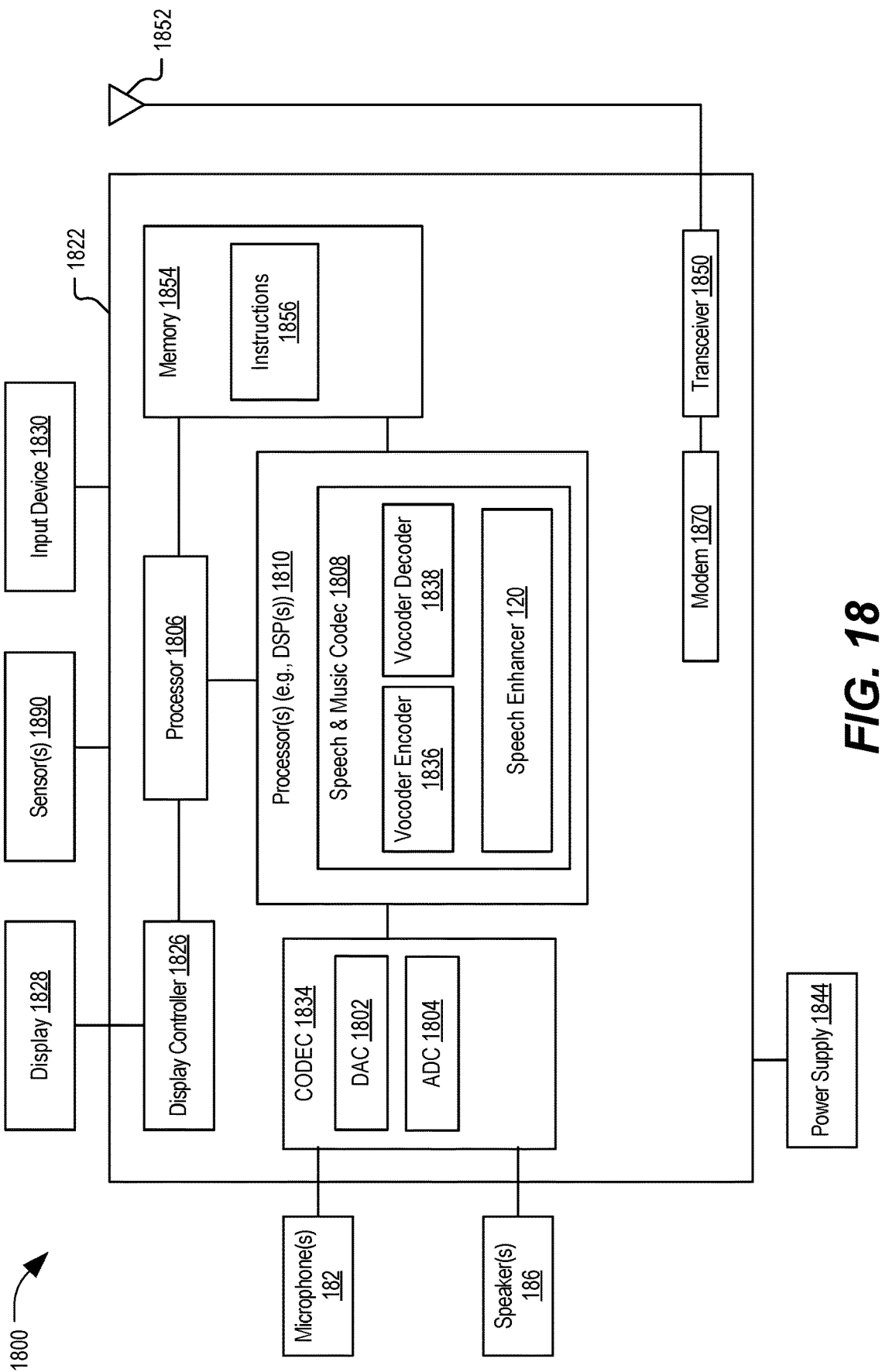
FIG. 18 is a block diagram of a particular illustrative example of a device that is operable to generate enhanced speech, in accordance with some examples of the present disclosure.

Referring to FIG. 18, a block diagram of a particular illustrative implementation of a device is depicted and generally designated 1800. In various implementations, the device 1800 may have more or fewer components than illustrated in FIG. 18. In an illustrative implementation, the device 1800 may correspond to the device 102 of FIG. 1. In an illustrative implementation, the device 1800 may perform one or more operations described with reference to FIGS. 1-17.

In a particular implementation, the device 1800 includes a processor 1806 (e.g., a central processing unit (CPU)). The device 1800 may include one or more additional processors 1810 (e.g., one or more DSPs). In a particular aspect, the processor 190 of FIG. 1 corresponds to the processor 1806, the processors 1810, or a combination thereof. The processors 1810 may include a speech and music coder-decoder (CODEC) 1808 that includes a voice coder ("vocoder") encoder 1836, a vocoder decoder 1838, the speech enhancer 120, or a combination thereof.

The device 1800 may include a memory 1854 and a CODEC 1834. The memory 1854 may include instructions 1856, that are executable by the one or more additional processors 1810 (or the processor 1806) to implement the functionality described with reference to the speech enhancer 120. The device 1800 may include a modem 1870 coupled, via a transceiver 1850, to an antenna 1852.

The device 1800 may include a display 1828 coupled to a display controller 1826. One or more speakers 186, one or more microphones 182, or both may be coupled to the CODEC 1834. The CODEC 1834 may include a digital-to-analog converter (DAC) 1802, an analog-to-digital converter (ADC) 1804, or both. In a particular implementation, the CODEC 1834 may receive analog signals from the microphone 182, convert the analog signals to digital signals using the analog-to-digital converter 1804, and provide the digital signals to the speech and music codec 1808. The speech and music codec 1808 may process the digital signals, and the digital signals may further be processed by the speech enhancer 120. In a particular implementation, the speech and music codec 1808 may provide digital signals to the CODEC 1834. The CODEC 1834 may convert the digital signals to analog signals using the digital-to-analog converter 1802 and may provide the analog signals to the speaker 186.

In a particular implementation, the device 1800 may be included in a system-in-package or system-on-chip device 1822. In a particular implementation, the memory 1854, the processor 1806, the processors 1810, the display controller 1826, the CODEC 1834, and the modem 1870 are included in a system-in-package or system-on-chip device 1822. In a particular implementation, an input device 1830, one or more sensors 1890 (e.g., one or more cameras 184), and a power supply 1844 are coupled to the system-on-chip device 1822. Moreover, in a particular implementation, as illustrated in FIG. 18, the display 1828, the input device 1830, the speaker 186, the microphone 182, the sensor 1890, the antenna 1852, and the power supply 1844 are external to the system-on-chip device 1822. In a particular implementation, each of the display 1828, the input device 1830, the speaker 186, the microphone 182, the sensor 1890, the antenna 1852, and the power supply 1844 may be coupled to a component of the system-on-chip device 1822, such as an interface or a controller.

The device 1800 may include a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, a navigation device, a smart speaker, a speaker bar, a mobile communication device, a smart phone, a cellular phone, a laptop computer, a tablet, a personal digital assistant, a digital video disc (DVD) player, a tuner, an augmented reality headset, a virtual reality headset, an aerial vehicle, a home automation system, a voice-activated device, a wireless speaker and voice activated device, a portable electronic device, a car, a vehicle, a computing device, a virtual reality (VR) device, a base station, a mobile device, or any combination thereof.

In conjunction with the described implementations, an apparatus means for obtaining input spectral data based on an input signal, the input signal representing sound that includes speech. In an example, the means for obtaining input spectral data includes the multi-encoder 192, the multi-encoder transformer 128, the speech enhancer 120, the processor 190, the device 102, the CODEC 1834, the transceiver 1850, the modem 1870, the input device 1830, the processor 1806, the one or more processors 1810, an input interface of the device 1800, one or more other circuits or components configured to obtain input spectral data, or any combination thereof.

The apparatus also includes means for processing, using a multi-encoder transformer, the input spectral data and context data to generate output spectral data that represents a speech enhanced version of the input signal. In an example, the means for processing the input spectral data and the context data includes the multi-encoder 192, the decoder 194, the multi-encoder transformer 128, the speech enhancer 120, the processor 190, the device 102, the processor 1810, the processor 1806, the device 1800, one or more other circuits or components configured to process the input spectral data and context data to generate output spectral data, or any combination thereof.

In some implementations, a non-transitory computer-readable medium (e.g., a computer-readable storage device, such as the memory 1854) includes instructions (e.g., the instructions 1856) that, when executed by one or more processors (e.g., the one or more processors 1810 or the processor 1806), cause the one or more processors to obtain input spectral data (e.g., the input spectral data 123) based on an input signal (e.g., the input signal 121), the input signal representing sound that includes speech. The instructions, when executed by the one or more processors, also cause the one or more processors to process, using a multi-encoder transformer (e.g., the multi-encoder transformer 128), the input spectral data and context data (e.g., the context data 127) to generate output spectral data (e.g., the output spectral data 129) that represents a speech enhanced version of the input signal.

Particular aspects of the disclosure are described below in a set of interrelated clauses:

According to Clause 1, a device to perform speech enhancement includes: one or more processors configured to: obtain input spectral data based on an input signal, the input signal representing sound that includes speech; and process, using a multi-encoder transformer, the input spectral data and context data to generate output spectral data that represents a speech enhanced version of the input signal.

Clause 2 includes the device of Clause 1, wherein the multi-encoder transformer includes: a multi-encoder that includes: a first encoder that includes a first attention network; at least a second encoder that includes a second attention network; and a decoder that includes a decoder attention network.

Clause 3 includes the device of Clause 1 or Clause 2, wherein the one or more processors are configured to: provide the input spectral data to the first encoder to generate first encoded data; obtain the context data based on one or more data sources; provide the context data to at least the second encoder to generate second encoded data; and provide, to the decoder attention network, the first encoded data and the second encoded data to generate output spectral data that corresponds to a speech enhanced version of the input spectral data.

Clause 4 includes the device of Clause 3, wherein the one or more data sources includes at least one of the input signal or image data.

Clause 5 includes the device of Clause 4, further including a camera configured to generate the image data.

Clause 6 includes the device of any of Clauses 3 to 5, wherein the decoder attention network includes: a first multi-head attention network configured to process the first encoded data; a second multi-head attention network configured to process the second encoded data; and a combiner configured to combine outputs of the first multi-head attention network and the second multi-head attention network.

Clause 7 includes the device of Clause 2, wherein the decoder further includes: a masked multi-head attention network coupled to an input of the decoder attention network; and a decoder feed forward network coupled to an output of the decoder attention network.

Clause 8 includes the device of any of Clauses 2 to 7, the first encoder including a Mel filter bank configured to filter the input spectral data.

Clause 9 includes the device of any of Clauses 2 to 8, further including an automatic speech recognition engine configured to generate text based on the input signal, wherein the context data includes the text.

Clause 10 includes the device of Clause 9, wherein the second encoder includes a grapheme-to-phoneme convertor configured to process the text.

Clause 11 includes the device of any of Clauses 2 to 10, wherein: the first encoder includes: a first layer including the first attention network, wherein the first attention network corresponds to a first multi-head attention network; and a second layer including a first feed forward network, and the second encoder includes: a first layer including the second attention network, wherein the second attention network corresponds to a second multi-head attention network; and a second layer including a second feed forward network.

Clause 12 includes the device of any of Clauses 1 to 11, further including a speaker recognition engine 208 configured to generate speaker extraction data based on the input signal, and wherein the context data includes the speaker extraction data.

Clause 13 includes the device of any of Clauses 1 to 12, further including an emotion recognition engine configured to generate emotion data based on the input signal, and wherein the context data includes the emotion data.

Clause 14 includes the device of any of Clauses 1 to 13, further including a noise analysis engine configured to generate noise type data 213 based on the input signal, and wherein the context data includes the noise type data.

Clause 15 includes the device of any of Clauses 1 to 14, further including: a microphone coupled to the one or more processors and configured to generate the input signal; and a spectral analyzer configured to generate the input spectral data.

Clause 16 includes the device of any of Clauses 1 to 15, further including a waveform generator configured to process the output spectral data to generate an output waveform corresponding to an enhanced version of the speech.

According to Clause 17, a method of speech enhancement includes: obtaining input spectral data based on an input signal, the input signal representing sound that includes speech; and processing, using a multi-encoder transformer, the input spectral data and context data to generate output spectral data that represents a speech enhanced version of the input signal.

Clause 18 includes the method of Clause 17, wherein processing the input spectral data includes: providing the input spectral data to a first encoder of the multi-encoder transformer to generate first encoded data; providing the context data to at least a second encoder of the multi-encoder transformer to generate second encoded data; and providing the first encoded data and the second encoded data to a decoder attention network of the multi-encoder transformer to generate output spectral data that corresponds to a speech enhanced version of the input spectral data.

Clause 19 includes the method of Clauses 17 or 18, further including obtaining the context data from one or more data sources, the one or more data sources including at least one of the input signal or image data.

Clause 20 includes the method of any of Clauses 17 to 19, further including: obtaining the input signal from a microphone; and processing the input signal at a spectral analyzer to generate the input spectral data.

Clause 21 includes the method of any of Clauses 17 to 20, further including generating text based on the input signal, wherein the context data includes the text.

Clause 22 includes the method of any of Clauses 17 to 21, further including generating speaker extraction data based on the input signal, and wherein the context data includes the speaker extraction data.

Clause 23 includes the method of any of Clauses 17 to 22, further including generating emotion data based on the input signal, and wherein the context data includes the emotion data.

Clause 24 includes the method of any of Clauses 17 to 23, further including generating noise type data based on the input signal, and wherein the context data includes the noise type data.

Clause 25 includes the method of any of Clauses 17 to 24, further including processing the output spectral data to generate an output waveform corresponding to an enhanced version of the speech.

According to Clause 26, a non-transitory computer-readable medium stores instructions that, when executed by one or more processors, cause the one or more processors to: obtain input spectral data based on an input signal, the input signal representing sound that includes speech; and process, using a multi-encoder transformer, the input spectral data and context data to generate output spectral data that represents a speech enhanced version of the input signal.

Clause 27 includes the non-transitory computer-readable medium of Clause 26, wherein the instructions are executable to cause the one or more processors to: provide the input spectral data to a first encoder of the multi-encoder transformer to generate first encoded data; provide the context data to at least a second encoder of the multi-encoder transformer to generate second encoded data; and provide the first encoded data and the second encoded data to a decoder attention network of the multi-encoder transformer to generate output spectral data that corresponds to a speech enhanced version of the input spectral data.

Clause 28 includes the non-transitory computer-readable medium of Clause 26 or Clause 27, wherein the instructions are executable to cause the one or more processors to obtain the context data from one or more data sources, the one or more data sources including at least one of the input signal or image data.

According to Clause 29, an apparatus includes: means for obtaining input spectral data based on an input signal, the input signal representing sound that includes speech; and means for processing, using a multi-encoder transformer, the input spectral data and context data to generate output spectral data that represents a speech enhanced version of the input signal.

Clause 30 includes the apparatus of Clause 29, wherein the means for obtaining and the means for processing are integrated into at least one of a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, or a navigation device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device to perform speech enhancement, the device comprising:
one or more processors configured to:
obtain input spectral data based on an input signal, the input signal representing sound that includes speech; and
process, using a multi-encoder transformer, the input spectral data and context data to generate output spectral data that represents a speech enhanced version of the input signal,
wherein the multi-encoder transformer includes:
a multi-encoder that includes:
a first encoder that includes a first attention network;
at least a second encoder that includes a second attention network; and
a decoder that includes a decoder attention network, wherein the decoder further comprises:
a masked multi-head attention network coupled to an input of the decoder attention network; and
a decoder feed forward network coupled to an output of the decoder attention network.

2. The device of claim 1, wherein the one or more processors are configured to:
provide the input spectral data to the first encoder to generate first encoded data;
obtain the context data based on one or more data sources;
provide the context data to at least the second encoder to generate second encoded data; and
provide, to the decoder attention network, the first encoded data and the second encoded data to generate output spectral data that corresponds to a speech enhanced version of the input spectral data.

3. The device of claim 2, wherein the one or more data sources includes at least one of the input signal or image data.

4. The device of claim 3, further comprising a camera configured to generate the image data.

5. The device of claim 2, wherein the decoder attention network comprises:
a first multi-head attention network configured to process the first encoded data;
a second multi-head attention network configured to process the second encoded data; and
a combiner configured to combine outputs of the first multi-head attention network and the second multi-head attention network.

6. The device of claim 1, the first encoder including a Mel filter bank configured to filter the input spectral data.

7. The device of claim 1, further comprising an automatic speech recognition engine configured to generate text based on the input signal, wherein the context data includes the text.

8. The device of claim 7, wherein the second encoder includes a grapheme-to-phoneme convertor configured to process the text.

9. The device of claim 1, wherein:
the first encoder comprises:

a first layer including the first attention network, wherein the first attention network corresponds to a first multi-head attention network; and
a second layer including a first feed forward network, and the second encoder comprises:
a first layer including the second attention network, wherein the second attention network corresponds to a second multi-head attention network; and
a second layer including a second feed forward network.

10. The device of claim 1, further comprising a speaker recognition engine configured to generate speaker extraction data based on the input signal, and wherein the context data includes the speaker extraction data.

11. The device of claim 1, further comprising an emotion recognition engine configured to generate emotion data based on the input signal, and wherein the context data includes the emotion data.

12. The device of claim 1, further comprising a noise analysis engine configured to generate noise type data based on the input signal, and wherein the context data includes the noise type data.

13. The device of claim 1, further comprising:
a microphone coupled to the one or more processors and configured to generate the input signal; and
a spectral analyzer configured to generate the input spectral data.

14. The device of claim 1, further comprising a waveform generator configured to process the output spectral data to generate an output waveform corresponding to an enhanced version of the speech.

15. A method of speech enhancement, the method comprising:
obtaining input spectral data based on an input signal, the input signal representing sound that includes speech; and
processing, using a multi-encoder transformer, the input spectral data and context data to generate output spectral data that represents a speech enhanced version of the input signal,
wherein processing, using the multi-encoder transformer, includes:
encoding, using a multi-encoder, wherein the encoding includes:
a first encoding by a first encoder using a first attention network;
at least a second encoding by a second encoder using a second attention network; and
decoding, using a decoder attention network, wherein the decoding includes:
providing an output of a masked multi-head attention network to an input of the decoder attention network; and
providing an output of the decoder attention network to a decoder feed forward network.

16. The method of claim 15, wherein processing the input spectral data includes:
providing the input spectral data to the first encoder of the multi-encoder transformer to generate first encoded data;
providing the context data to at least the second encoder of the multi-encoder transformer to generate second encoded data; and
providing the first encoded data and the second encoded data to the decoder attention network of the multi-encoder transformer to generate output spectral data that corresponds to a speech enhanced version of the input spectral data.

17. The method of claim 15, further comprising obtaining the context data from one or more data sources, the one or more data sources including at least one of the input signal or image data.

18. The method of claim 15, further comprising:
obtaining the input signal from a microphone; and
processing the input signal at a spectral analyzer to generate the input spectral data.

19. The method of claim 15, further comprising generating text based on the input signal, wherein the context data includes the text.

20. The method of claim 15, further comprising generating speaker extraction data based on the input signal, and wherein the context data includes the speaker extraction data.

21. The method of claim 15, further comprising generating emotion data based on the input signal, and wherein the context data includes the emotion data.

22. The method of claim 15, further comprising generating noise type data based on the input signal, and wherein the context data includes the noise type data.

23. The method of claim 15, further comprising processing the output spectral data to generate an output waveform corresponding to an enhanced version of the speech.

24. A non-transitory computer-readable medium storing instructions that, when executed by one or more processors, cause the one or more processors to:
obtain input spectral data based on an input signal, the input signal representing sound that includes speech; and
process, using a multi-encoder transformer, the input spectral data and context data to generate output spectral data that represents a speech enhanced version of the input signal,
wherein processing, using the multi-encoder transformer includes:
encoding, using a multi-encoder, wherein the encoding includes:
a first encoding by a first encoder using a first attention network;
at least a second encoding by a second encoder using a second attention network; and
decoding, using a decoder attention network, wherein the decoding further comprises:
providing an output of a masked multi-head attention network to an input of the decoder attention network; and
providing an output of the decoder attention network to a decoder feed forward network.

25. The non-transitory computer-readable medium of claim 24, wherein the instructions are executable to cause the one or more processors to:
provide the input spectral data to the first encoder of the multi-encoder transformer to generate first encoded data;
provide the context data to at least the second encoder of the multi-encoder transformer to generate second encoded data; and
provide the first encoded data and the second encoded data to the decoder attention network of the multi-encoder transformer to generate output spectral data that corresponds to a speech enhanced version of the input spectral data.

26. The non-transitory computer-readable medium of claim 24, wherein the instructions are executable to cause the one or more processors to obtain the context data from one or more data sources, the one or more data sources including at least one of the input signal or image data.

27. An apparatus comprising:
  means for obtaining input spectral data based on an input signal, the input signal representing sound that includes speech; and
  means for processing, using a multi-encoder transformer, the input spectral data and context data to generate output spectral data that represents a speech enhanced version of the input signal,
  wherein the means for processing, using the multi-encoder transformer, includes:
    means for encoding using a multi-encoder, wherein the means for encoding includes:
      means for a first encoding by a first encoder using a first attention network;
      means for at least a second encoding by a second encoder using a second attention network; and
    means for decoding, using a decoder attention network, further comprises:
      means for providing an output of a masked multi-head attention network to an input of the decoder attention network; and
      means for providing an output of the decoder attention network to a decoder feed forward network.

28. The apparatus of claim 27, wherein the means for obtaining and the means for processing are integrated into at least one of a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, or a navigation device.

* * * * *